(12) United States Patent
Yamamoto

(10) Patent No.: US 6,233,697 B1
(45) Date of Patent: May 15, 2001

(54) STORAGE APPARATUS SYSTEM HAVING REDUNDANCY IN A RAIL CONFIGURATION

(75) Inventor: Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/041,625

(22) Filed: Mar. 13, 1998

(30) Foreign Application Priority Data

Mar. 14, 1997 (JP) .................................................. 9-060508

(51) Int. Cl.⁷ ...................................................... G06F 11/16
(52) U.S. Cl. ...................................................... 714/6; 714/5
(58) Field of Search ............................ 714/5, 6; 711/114

(56) References Cited

U.S. PATENT DOCUMENTS

| | | | |
|---|---|---|---|
| 5,208,813 | * | 5/1993 | Stallmo ..................................... 714/7 |
| 5,758,057 | * | 5/1998 | Baba et al. ............................... 714/6 |
| 5,970,030 | * | 10/1999 | Dimitri et al. ......................... 369/36 |

OTHER PUBLICATIONS

"Method to Enhance Disk Reliability in Optical Libraries" IBM Tech, Disclosure Bulletin, Aug. 1993.*
Patterson "A Case for RAID" ACM SIGMOD Conference Proceding, Chicago, IL, Jun. 1, 1988, p. 109–116.*
Bell, "DVD Applications" Comdex '96, Nov. 20, 1996.*

* cited by examiner

Primary Examiner—Robert W. Beausoliel, Jr.
Assistant Examiner—Bryce Bonzo
(74) Attorney, Agent, or Firm—Antonelli, Terry, Stout & Kraus, LLP

(57) ABSTRACT

A storage apparatus system using portable storage media with redundancy. When a failure occurs in any of the portable storage media, the storage apparatus system executes a processing to recover data stored in the storage media incurring the failure while accepting a read/write request from an information processing unit connected to the storage apparatus system. The storage apparatus system includes a function to allocate a read/write unit to perform the recovery processing independently of a request issued by the information processing unit. A control unit provided in the storage apparatus system includes a function for temporarily suspending recovery processing when a read/write request for a read/write unit allocated to the recovery processing is received from the information processing unit and for resuming the recovery processing when the recovery processing has been completed.

11 Claims, 15 Drawing Sheets

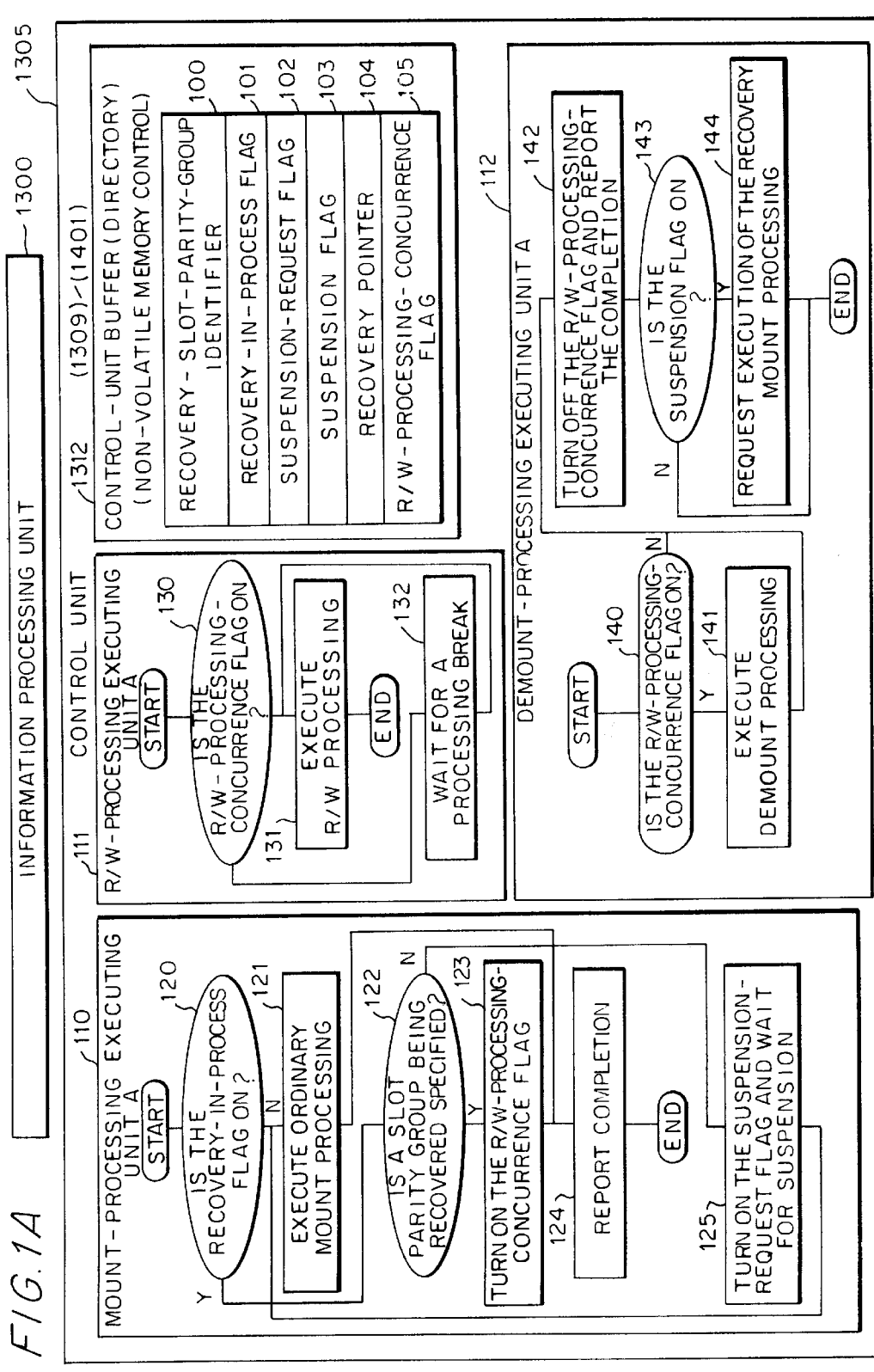

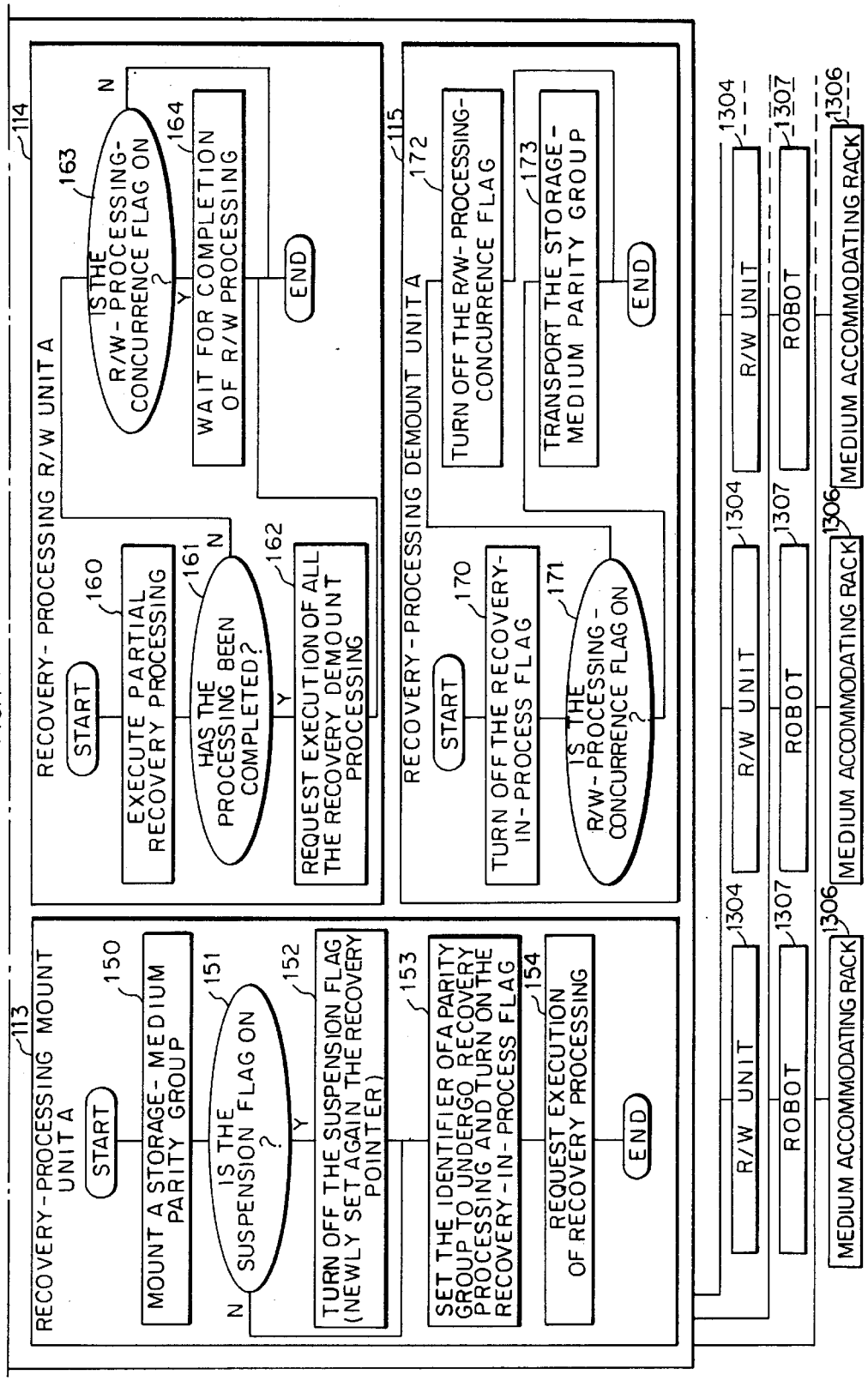

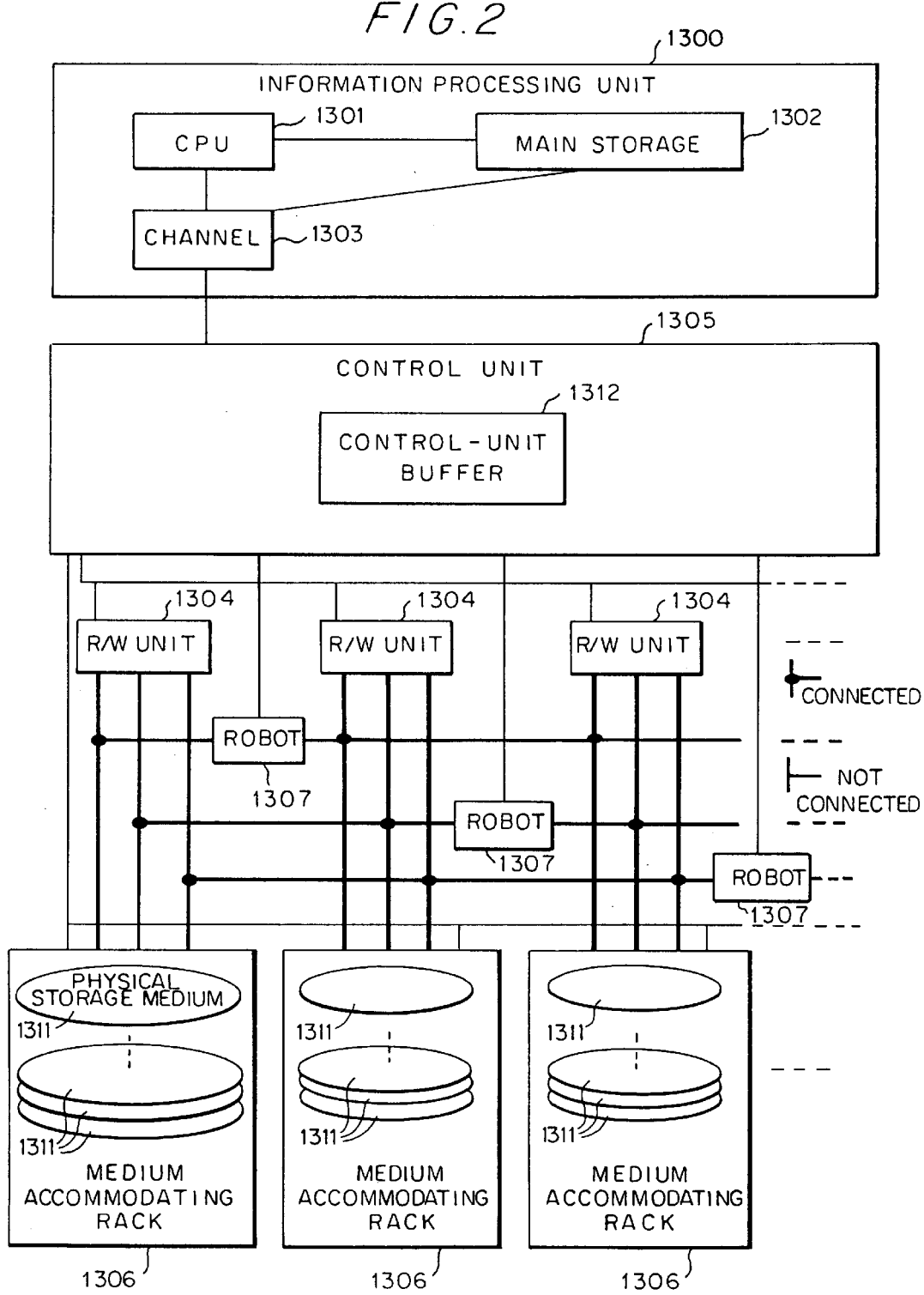

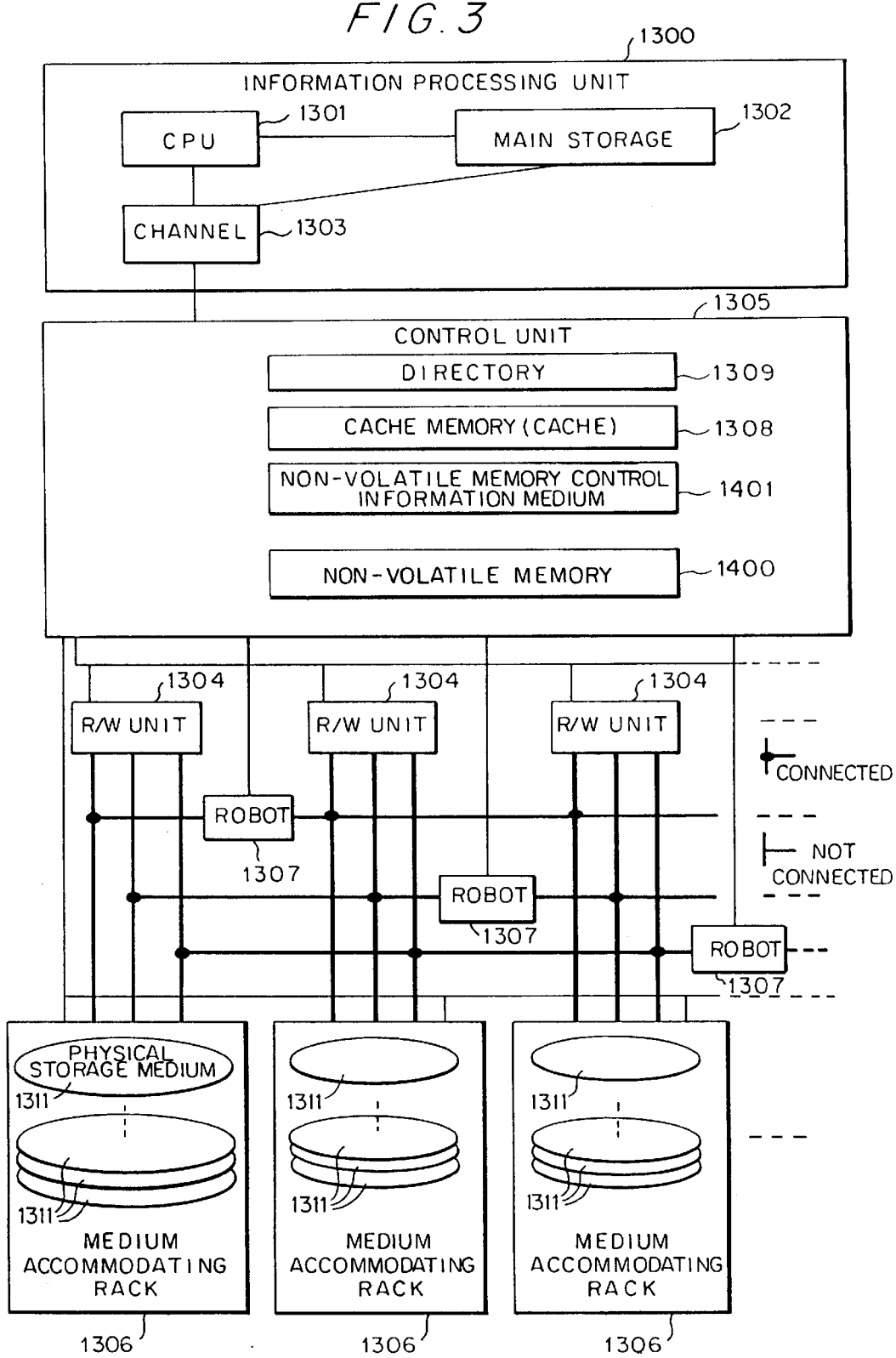

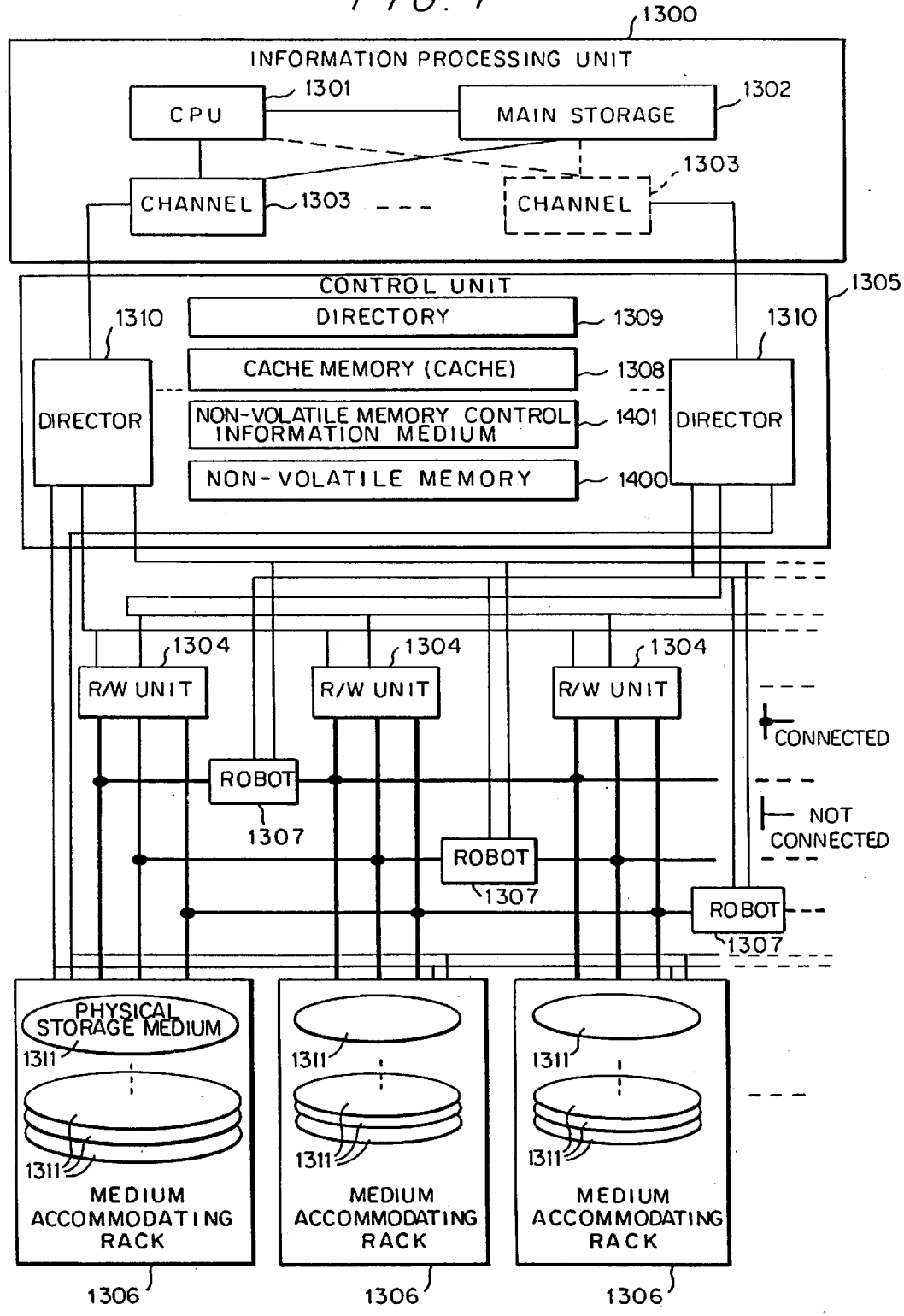

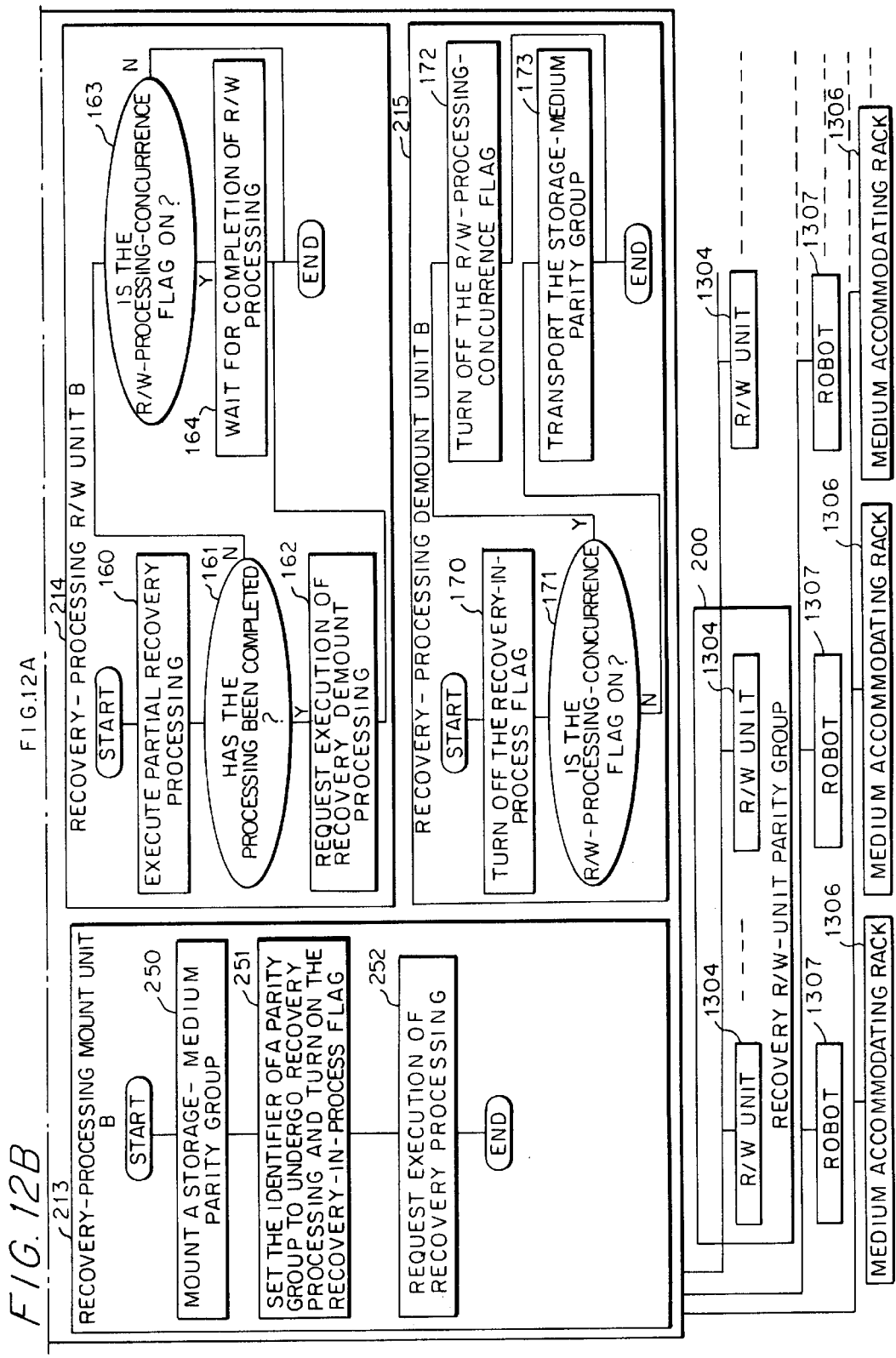

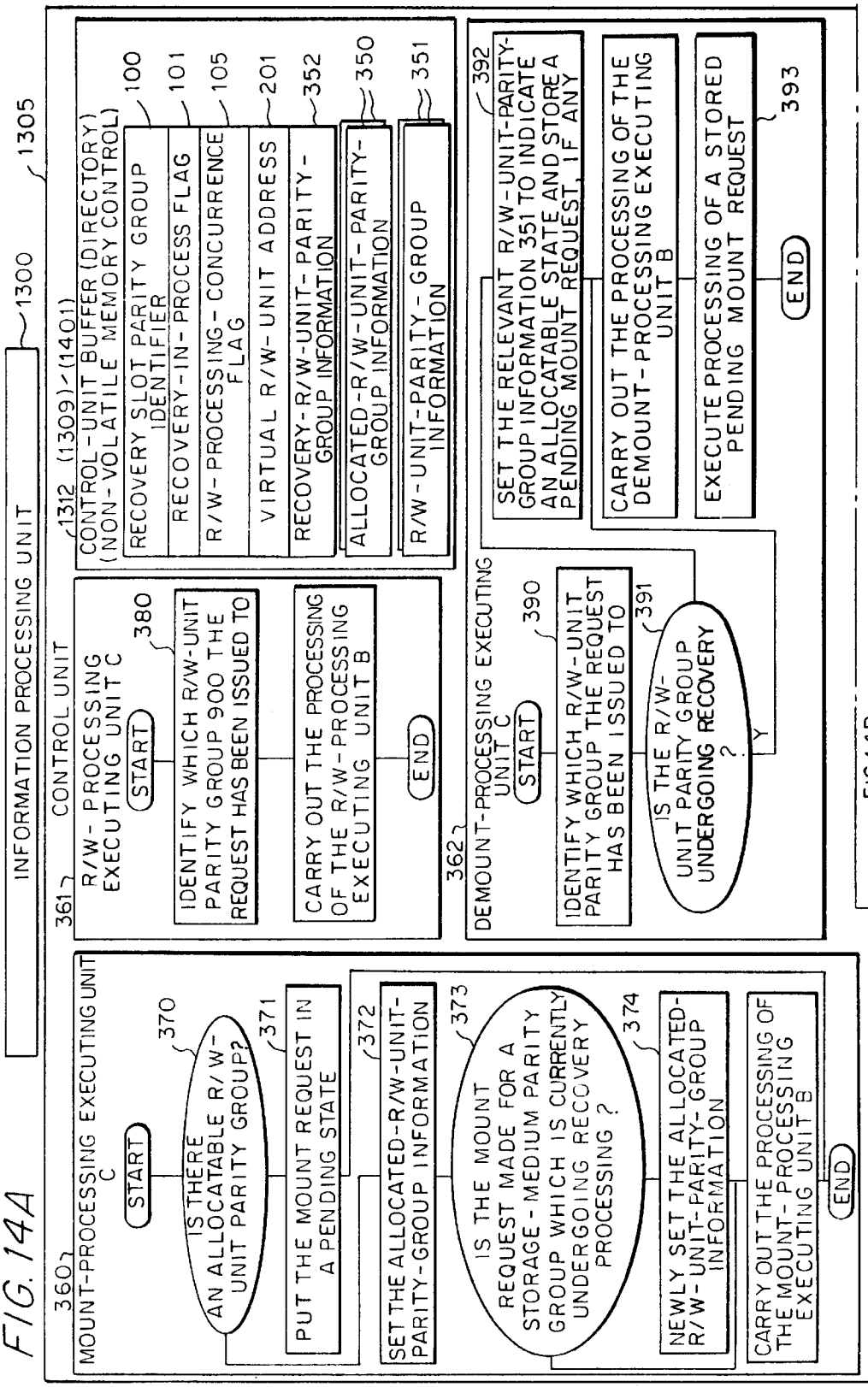

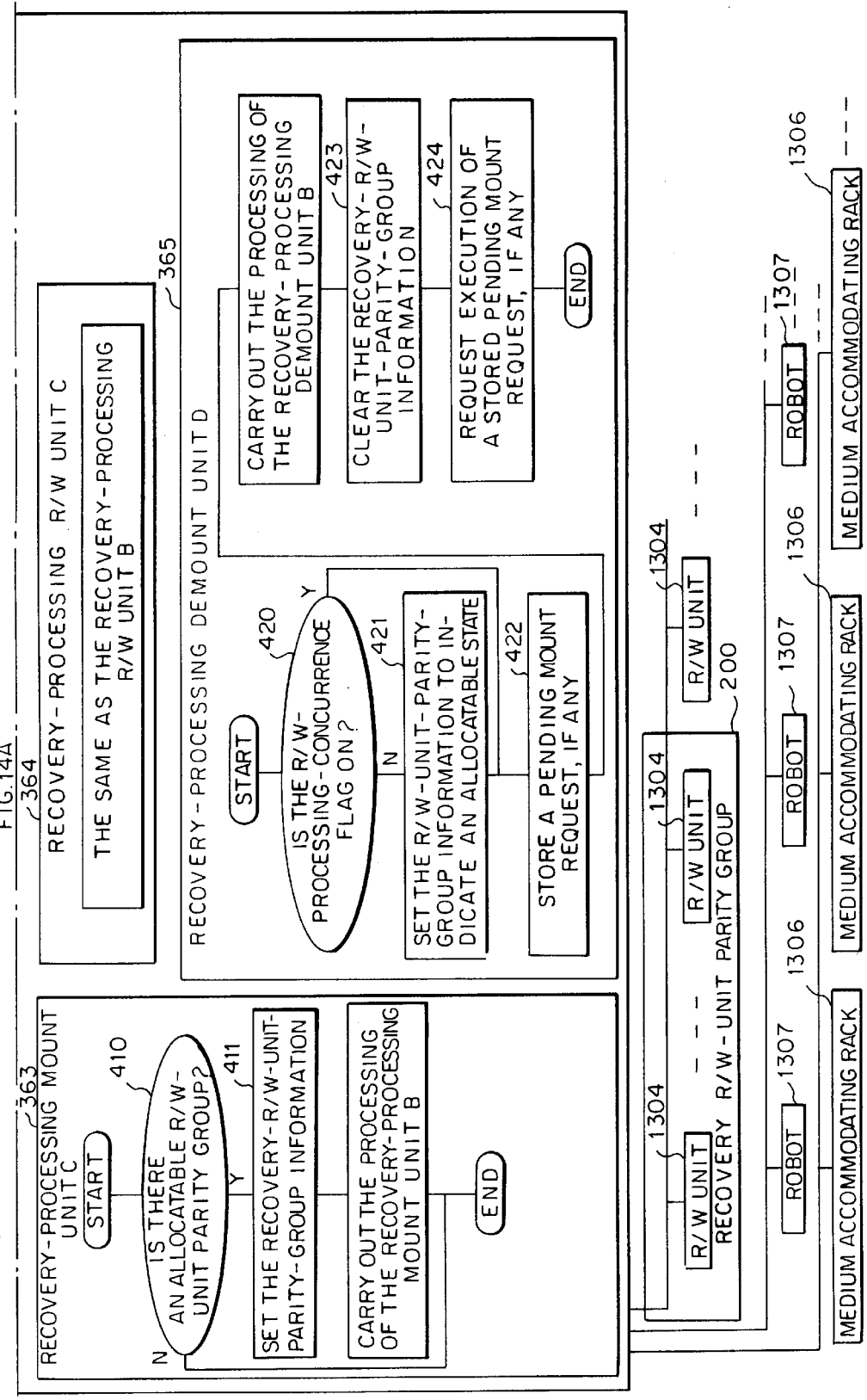

STORAGE APPARATUS SYSTEM HAVING REDUNDANCY IN A RAIL CONFIGURATION

BACKGROUND OF THE INVENTION

The present invention relates in general to a storage apparatus system. More particularly the present invention relates to a storage apparatus system which has redundancy in each configuration element thereof for increasing the availability of the storage apparatus system.

Storage systems using redundant disk arrays are well known as evidenced by "A Case for Redundant Arrays of Inexpensive Disk (RAID)", by D. A. Patterson, et al. ACM SIGMOD conference proceeding, Chicago, Ill., Jun. 1, 1988, pp. 109 to 116 (Document 1).

A disk array is a disk system for increasing the performance and the reliability of the disk system. In a disk array, a plurality of physical disk drives are arranged so that the physical disk drives appear to an information processing unit as a single logical disk drive in order to enhance the performance. In order to improve reliability, redundant data is stored in a separate disk drive so that data existing prior to the occurrence of a failure can be recovered.

In general, units in which data is read and written from and to a disk drive is called a record. Document 1 proposes some techniques for arranging records. When a disk array is used, however, a record seen from an information processing unit as a read/write unit have a data length different from that of a record actually stored in a disk drive. Hereafter, the former and the latter are referred to as a logical record and a physical record respectively. The following is description of some techniques of arranging records which are proposed in Document 1.

According to a first technique of arranging records, a logical record, that is, a record seen from the processing apparatus side, is stored in a disk drive by dividing the logical record into m physical records where m≧1. This technique is referred to hereafter as a division arrangement technique. By adopting the division arrangement technique, one logical record can be stored in m units of disk drives. Thus, the data transfer speed appears to the information processing unit as a speed m times faster then if the logical record was stored in a single disk device.

Next, a method of creating redundant data according to the division arrangement technique is explained. According to the division arrangement technique, for m physical records resulting from the division of a logical record, n pieces of redundant data are created where n≧1. The pieces of redundant data are each stored in disk drives as a physical record. Thus, the pieces of redundant data are stored in the disk drives as a total of n physical records. In order to distinguish a physical record of data directly read out or written by an information processing unit from a physical record of redundant data, the former and the latter are referred to hereafter as a data record and a parity record respectively. A group including m data records and n parity records is known as a parity group. In general, if there are n parity records in a parity group, data in the parity group can be recovered when failures occurs in up to n units of disk drives. It should be noted that since a disk drive is normally used for storing a plurality of records, a disk drive contains records pertaining to a plurality of parity groups. Here, (m+n) units of disk drives containing a plurality of parity groups each including (m+n) records is referred to hereafter as a disk parity group. That is to say, a disk parity group is a set of disk drives sharing common redundant data.

According to a second technique of arranging records, one logical record, that is, a read/write unit seen from the processing apparatus side, is stored in a disk drive as a physical record, that is, as one data record. The second technique is referred to hereafter as a non-division arrangement technique. Thus, one logical record is equivalent to one data record. Also in this case, since a physical record can be a data record or a parity record, a physical record is not necessarily equivalent to a logical record. That is to say, a logical record is stored as a physical record but a physical record is not always a logical record. Because a physical record may be a parity record. The non-division arrangement technique offers a feature that read/write processing can be individually carried out on each of the disk drives constituting a disk array.

When the division arrangement technique is adopted, on the other hand, it is necessary to occupy a plurality of disk drives to expedite one read/write processing. As a result, by adopting the non-division arrangement technique, the enhancement of the concurrence of the read/write processing that can be executed in a disk array can be realized. Also in the case of the non-division arrangement technique, n parity records are created from m data records and stored in disk drives. In the case of the division arrangement technique, however, a set of data records pertaining to a parity group appears to an information processing unit as a logical record. Meanwhile, in the case of the non-division arrangement technique, on the other hand, each data record appears to an information processing unit as a completely independent logical record.

U.S. Pat. No. 5,208,813 (Document 2) discloses a technology in which a read/write request from an information processing unit can be accepted while a processing to recover data from a failed disk drive on a new disk drive is being carried out. With this technology, the processing to recover data on a new disk drive is divided into a plurality of recovery processings corresponding to divided disk-area units. By performing a processing to handle a read/write request from an information processing unit between pieces of recovery processings for the divided disk area units, the read/write request can be accepted.

In many computer systems, storage apparatuses other than the disk drive are employed. Examples of such storage apparatuses are a magnetic tape and an optical storage device. Recently, much attention has been given to DVD (Digital Versatile Disk). A feature of these storage apparatuses is that, in either case, a storage medium thereof is a separated component from a R/W (Read/Write) unit. Data is read or written from or to a storage medium which is mounted on the R/W unit. In general, such a storage medium is known as a portable medium. In order to implement the control of a very large number of portable storage media with ease in a large-scale computer system, the concept of a library is introduced. A library usually includes not only a large number of storage media and a R/W unit, but also equipment such as a robot for transporting a storage medium back and forth between the R/W unit and a medium accommodating rack for accommodating the storage media.

Since the amount of data handled in a computer system is becoming larger and larger with time, the need for the enhancement of the availability of the data is also extremely high. For this reason, by applying a concept like the one proposed in Document 1 to a storage apparatus system including portable storage media as described above, high data availability can be realized.

Applying such a concept to portable storage media is disclosed, for example, in "DVD Applications," by A. E. Bell of IBM Research Division, Comdex 96, Nov. 20, 1996

(Document 3). Document 3 proposes RAIL (Redundant Arrays of Inexpensive Libraries) having redundancy and including a plurality of ordinary libraries each composed of DVDs, a R/W unit and a robot.

As disclosed in Document 2 a read/write request from an information processing unit can be accepted while a processing to recover data on a failed disk drive onto a new disk drive is being carried out.

The main purpose of introducing a system having redundancy like a disk array is not only to prevent data from being lost in the event of a failure, but also to accept data accesses from an information processing unit even when a failure occurs. Thus, when a failure occurs in a storage medium prohibit a data access from an information processing unit to portable storage media having redundancy like the RAIL is a disadvantage. Further prohibiting a data access to a storage medium other than the storage medium incurring the failure is also a disadvantage.

The purposes described above can not be achieved even if a technology like the one disclosed in Document 2 is applied to a storage apparatus system for portable storage media having redundancy. This is clear being that, in the case of a portable storage medium, the storage medium and the R/W unit are separated from each other. As R/W units not directly related to a failure are required in order to recover data stored in a storage medium incurring the failure, it becomes a new problem how R/W units are allocated to the recovery processing. Since a portable storage medium is not taken into consideration at all in Document 2, a solution to such a problem is not described at all therein either.

SUMMARY OF THE INVENTION

It is an object of the present invention to provide a storage apparatus system for portable storage media having redundancy with a function for executing a read/write access to data stored in a storage medium incurring a failure as well as a read/write access to data stored in a storage medium other than the storage medium incurring the failure.

In order to aid in the understanding of the present invention it should be noted that the following describes a case in which n parity records are created from m data records and the parity and data records are arranged to be stored in (m+n) pieces of storage medium. The (m+n) pieces of physical storage medium appear to an information processing unit as a single logical storage medium.

In addition, in the case of a storage apparatus system for portable storage media, when a request is made by an information processing unit to mount a storage medium on a R/W unit, the storage medium is mounted before starting read/write processing on the storage medium. Since (m+n) pieces of physical storage medium appear to an information processing unit as a single logical storage medium as described above, in actuality, (m+n) pieces of storage medium are mounted on (m+n) R/W units. Thereafter, the read/write processing is carried out on the (m+n) pieces of storage medium. Upon completion of the read/write processing, the information processing unit further makes a request to return the logical storage medium from the R/W units to a medium accommodating rack.

In the configuration described above the storage apparatus system for controlling portable storage media includes only (m+n) R/W units. Since (m+n) R/W units are required for recovering data stored in a storage medium incurring a failure, all the (m+n) R/W units are used in the recovery processing.

When a request is made to mount a logical storage medium corresponding to (m+n) pieces of physical storage medium for recovery processing and the logical storage medium happen to be mounted on R/W units the mount request is completed as if the processing to mount the storage medium had been carried out at the request.

When a request to mount a storage medium other than those undergoing recovery processing is received, execution of the request can not be started because no R/W unit is available. In such a case, in the present invention the recovery processing is temporarily suspended and a storage medium undergoing the recovery processing is temporarily returned to a medium accommodating rack. In addition, information on the state of progress of the recovery processing is stored. The requested storage medium is then mounted. When a request to demount the mounted storage medium is received, demount processing is carried out before resuming the suspended recovery processing from the point indicated by the stored state of progress information.

In another configuration, the storage apparatus system for controlling portable storage media includes a plurality of sets or groups each comprising (m+n) R/W units. In such a configuration, when a set or a group of (m+n) R/W units are being used for carrying out recovery processing, read/write processing requested by the information processing unit can be performed by using the remaining R/W units. In such a configuration, there are three possible methods. In the first of the three methods, (m+n) R/W units are reserved at all times for recovery processing.

In the second of the three methods, a logical R/W unit, namely, (m+n) physical R/W units, are allocated at the time recovery processing becomes necessary. However, in this method it is possible for a request to mount a logical storage medium to be issued by the information processing unit specifying a logical R/W unit is being used in recovery receiving. If the recovery processing is suspended, the effect will be the same as that of the configuration having only (m+n) R/W units. As a possible solution to this problem, the logical R/W unit currently allocated to the recovery processing is set to appear to the information processing unit as if it has failed. Since this configuration includes other available sets each comprising (m+n) R/W units, the information processing unit is capable of executing read/write processing by using one of the remaining sets of R/W units. Upon completion of the recovery processing the information processing unit is informed that the failed logical R/W unit has recovered.

The third of the three methods is a method wherein the relation between the logical R/W unit seen by the information processing unit and (m+n) physical storage units is dynamically changed. More specifically, the relation between the logical R/W unit seen by the information processing unit and (m+n) physical storage units is changed by the storage apparatus system so that the information processing unit will work without using (m+n) storage units currently allocated to recovery processing.

BRIEF DESCRIPTION OF THE DRAWINGS

The present invention will be more apparent from the following detailed description, when taken in conjunction with the accompanying drawings, in which:

FIGS. 1A–1B are diagrams illustrating the configuration and the operation of a first embodiment implementing a storage apparatus system provided by the present invention;

FIG. 2 is a diagram illustrating the configuration of a computer system to which the present invention is applied;

FIG. 3 is a diagram illustrating the configuration of another computer system to which the present invention is applied;

FIG. 7 is a diagram illustrating a configuration wherein a plurality of directors exist;

FIGS. 14A–14B are diagrams illustrating the configuration and the operation of a fourth embodiment implementing a storage apparatus system provided by the present invention.

DESCRIPTION OF THE PREFERRED EMBODIMENTS

Figure 4:
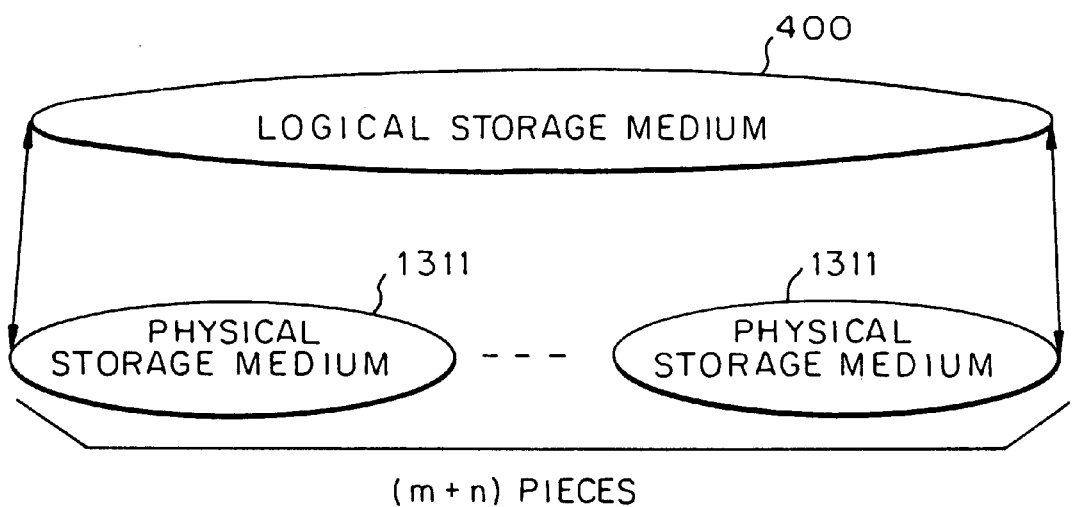
FIG. 4 is a diagram illustrating the configuration of a logical storage medium.

FIG. 2 is a diagram illustrating the configuration of a computer system to which the present invention is applied. As illustrated in FIG. 2 the computer system includes an information processing unit 1300, a control unit 1305, a plurality of R/W units 1304, a plurality of medium accommodating racks 1306 and one or more robots 1307. The information processing unit 1300 typically includes a CPU 1301, a main storage unit 1302 and a channel 1303. The control unit 1305 executes a processing to transfer data between the information processing unit 1300 and a R/W unit 1304 in accordance with a read/write request issued by the information processing unit 1300. A control unit buffer 1312 is a buffer for temporarily storing data read out or written to the control unit 1305.

In each of the medium accommodating racks 1306, a plurality of physical storage media 1311 each for storing data are accommodated in accommodating units. Each of the robots 1307 conveys a physical storage medium 1311 between a medium accommodating rack 1306 and a R/W unit 1304. The R/W unit 1304 writes and reads data into and from a physical storage medium 1311 set by the robot 1307.

FIG. 3 is a diagram illustrating the configuration of another computer system to which the present invention is applied. As illustrated in FIG. 3, the computer system illustrated therein is different from the one illustrated in FIG. 2. In the computer system illustrated in FIG. 3 the control unit 1305 includes a cache memory unit 1308, a directory 1309, a non-volatile memory unit 1400 and a non-volatile memory control information medium 1401. The cache memory unit 1308, which is referred to hereafter merely as a cache, is used for storing some of the data stored in a physical storage medium 1311 set on the R/W unit 1304. The directory 1309 stores management information of the cache 1308. The non-volatile memory 1400 is a non-volatile medium and stores some of data of the physical storage medium 1311 set in the R/W unit 1304 in the same way that the cache 1308 does. The non-volatile memory control information medium 1401 is also a non-volatile medium for storing control information of the non-volatile memory unit 1400. The control unit 1305 executes read/write operations between the R/W unit 1304 and the cache 1308 asynchronously with read/write requests issued by the information processing unit 1300. When the control unit 1305 includes two or more directors 1310 as illustrated in FIG. 7, the present invention is also applicable to a configuration wherein each of the directors 1310 executes a read/write operation in accordance with a read/write request received from the information processing unit 1300.

Normally, a unit of data is read out or written by the information processing unit 1300 known as a record. However, a record, more specifically a logical record, seen from the information processing unit 1300 in some cases differs from a record, more specifically a physical record, actually stored in the physical storage medium 1311. The following is a description of a storage format of data.

Figure 5:
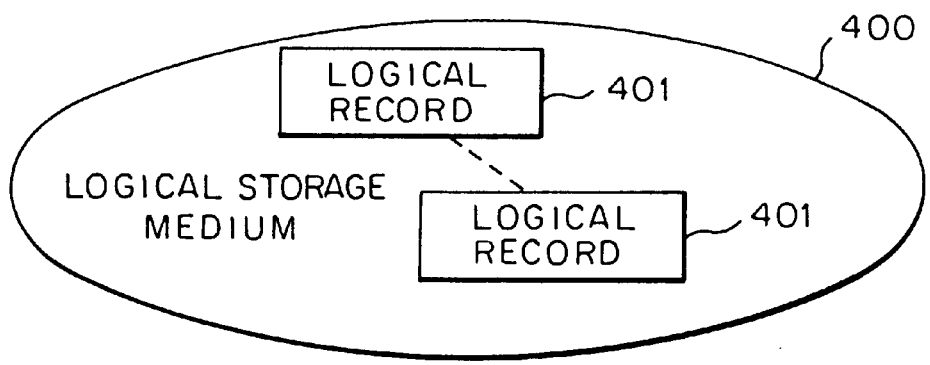
FIG. 5 is a diagram illustrating a relation between a logical record and physical records.

A storage format on the physical storage medium 1311 is explained by referring to FIGS. 4, 5 and 6 as follows. As illustrated in FIG. 4, a plurality of physical storage media 1311 are seen by the information processing unit 1300 as a single logical storage medium 400. The physical storage medium 1311 is a single physical storage medium which is stored in an accommodation unit in the medium accommodating rack 1306. The physical storage unit 1311 is a transportation unit of the robot 1307 and can be mount/demount on the R/W unit 1304. In the configuration illustrated in FIG. 4, (m+n) units of physical storage medium 1311 constitute one logical storage medium 400. A logical record 401 illustrated in FIG. 5 is a record read out or written by the information processing unit 1300.

Figure 6:
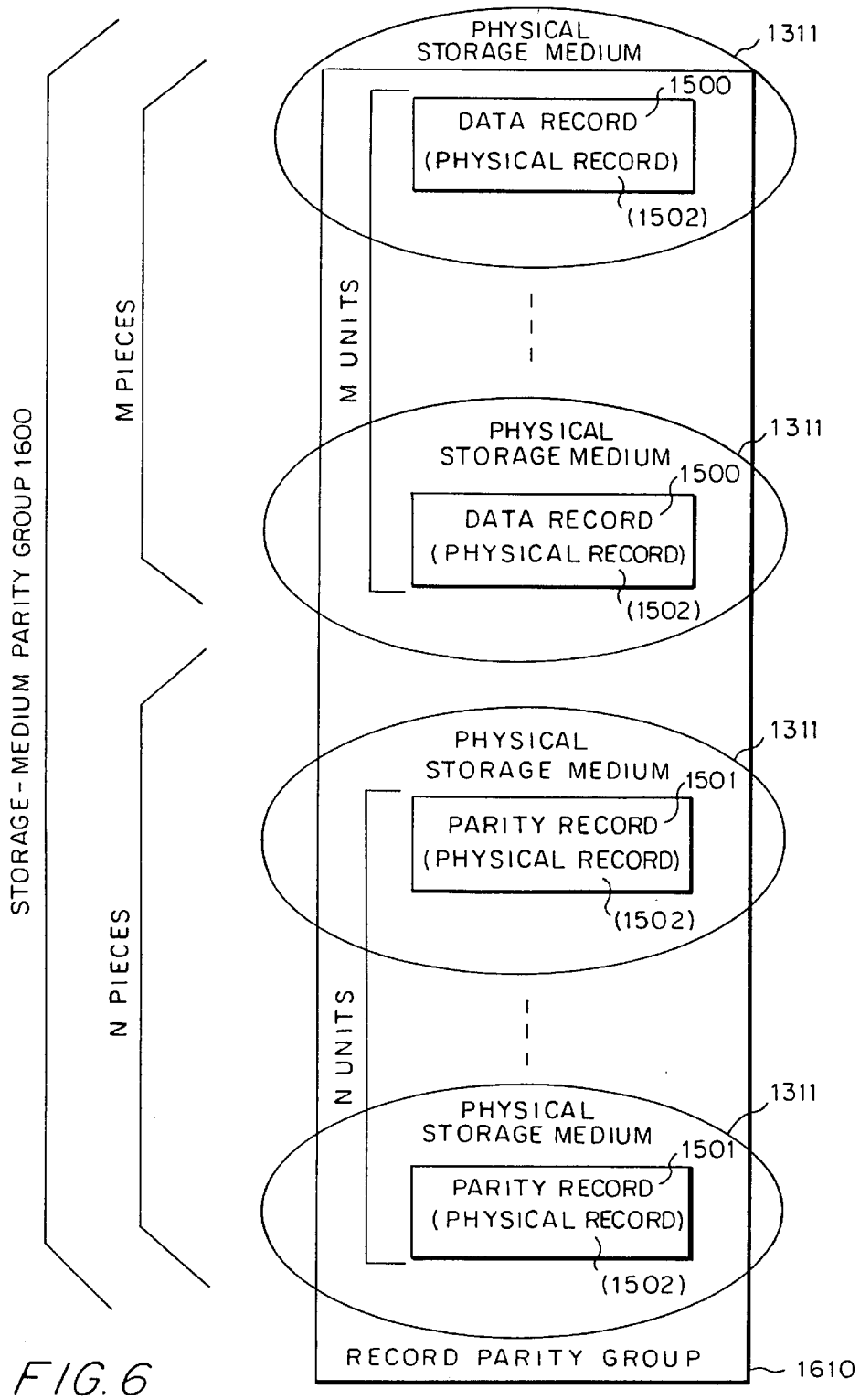
FIG. 6 is a diagram illustrating the configurations of a storage-medium parity group and a record parity group.

In a configuration illustrated in FIG. 6, a read/write unit actually exchanged between the R/W unit 1304 and the control unit 1305, and recorded on the physical storage medium 1311 is referred to as a physical record 1502. In the present invention, a physical record 1502 recorded on the physical storage medium 1311 can be a data record 1500 or a parity record 1501. A data record 1500 is a physical record 1502 containing contents of a logical record 401. A parity record 1501 is a physical record used in processing to recover contents of data records 1500 lost in the event of a failure occurring in a physical storage medium 1311. If the contents of a data record 1500 are changed, it is necessary to also modify the contents of a parity record 1501 associated with the data record 1500.

Next, a storage medium parity group 1600 and a record parity group 1610 are explained by referring to FIG. 6. In a configuration illustrated in FIG. 6, the record parity group 1610 which includes (m+n) units of physical storage medium 1311 appears to the information processing unit 1300 as a single logical medium 400.

The storage medium parity group 1600 is explained as follows. The storage medium parity group 1600 includes a record parity group 1610 which includes (m+n) units of physical storage media 1311. In each of the physical storage media 1311, a data record 1500 is stored. Thus, there are stored a total of m data records 1500 in the record parity group 1610. From these m data records 1500, n parity records 1501 are created. In the record parity group 1610 illustrated in FIG. 6, the n parity records 1501 are stored in their respective physical storage media 1311. Thus, the storage medium parity group 1600 illustrated in FIG. 6 includes m data records 1500 and n parity records 1501. In general, if there are n parity records 1501 in a storage medium parity group 1600, data in all physical records 1502 in the storage medium parity group 1600 can be recovered in the event of failures occurring in up to n units of physical storage medium 1311 among the (m+n) units of physical storage medium in which the physical records 1502 of the storage medium parity group 1600 are stored. As a result, high reliability of the physical record media 1311 can be realized. In each of the physical storage media 1311, a plurality of physical records 1502 are stored, and in one storage-medium parity group 1600 a plurality of record parity groups 1610 can be included.

Figure 8A:
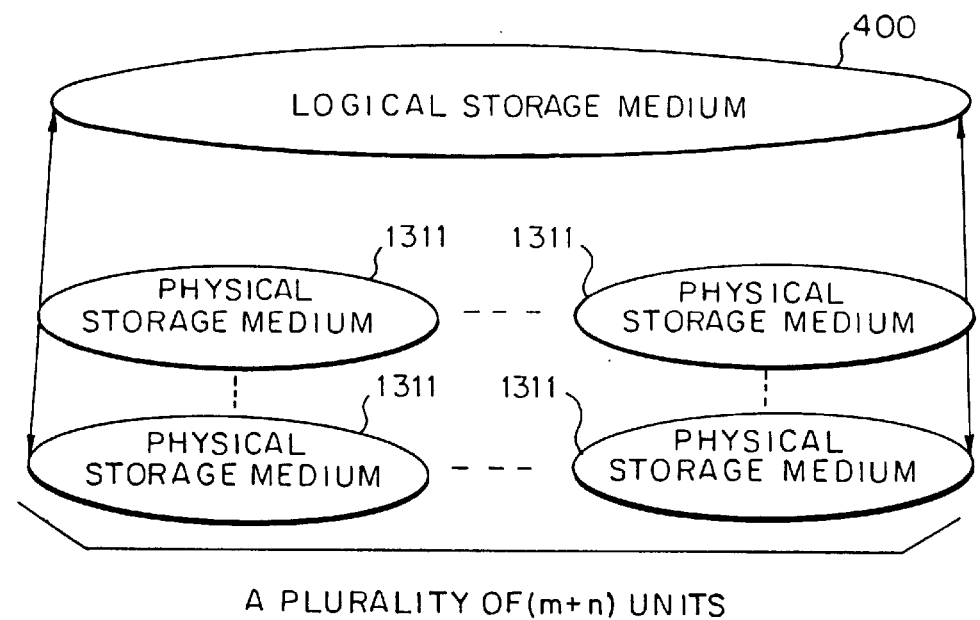
FIGS. 8A–8B are diagrams each illustrating a relation between logical storage media and storage medium parity groups.
Figure 8B:
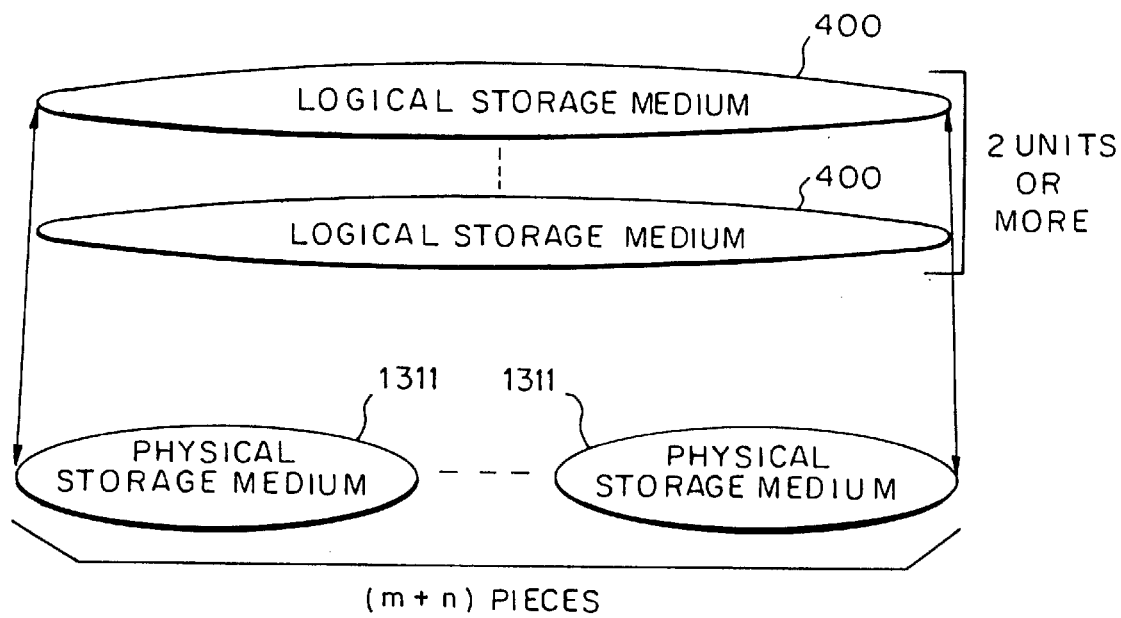

In addition, a storage medium parity group 1600 may correspond to a plurality of logical storage media 400 as illustrated in FIG. 8B. In the present invention, one logical storage medium 400 can also correspond to a plurality of storage medium parity groups as illustrated in FIG. 8A.

Figure 9:
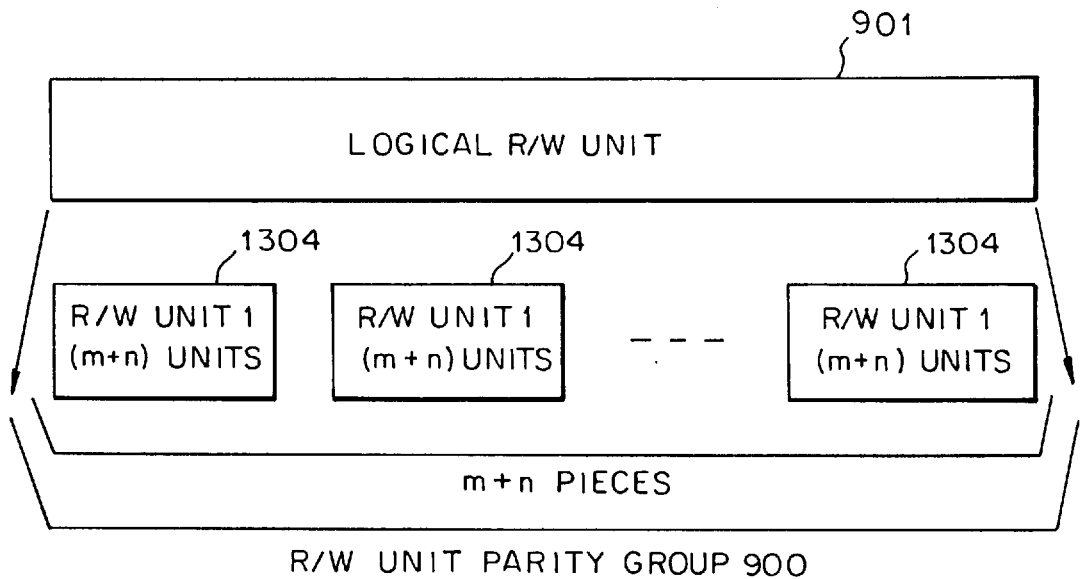
FIG. 9 is a diagram illustrating the configuration of a R/W-unit parity group and a logical R/W unit.

FIG. 9 is a diagram illustrating a R/W unit parity group 900 and a logical R/W unit 901. As illustrated in FIG. 9, the R/W unit parity group 900 includes (m+n) R/W units 1304 on which the physical storage media pertaining to the storage medium parity group 1600 are mounted. In the present embodiment, one or more R/W unit parity groups 900 are connected to the control unit 1305. On the other hand, the R/W unit parity group 900 appears to the information processing unit 1300 as a logical R/W unit 901 for executing R/W processing on data stored in the logical storage medium 400 mounted thereon. In the case of a storage medium parity group 1600 corresponding to a logical storage medium 400 or in the case of a storage medium parity group 1600 corresponding to a plurality of logical storage media 400 as illustrated in FIG. 8B, a R/W unit parity group 900 corresponds to a logical R/W unit 901 on a one-to-one basis. In the case of a plurality of storage medium parity groups 1600 corresponding to a logical storage medium 400 as illustrated in FIG. 8A, a R/W unit parity group 900 corresponds to a plurality of logical R/W unit units 901.

Figure 10:
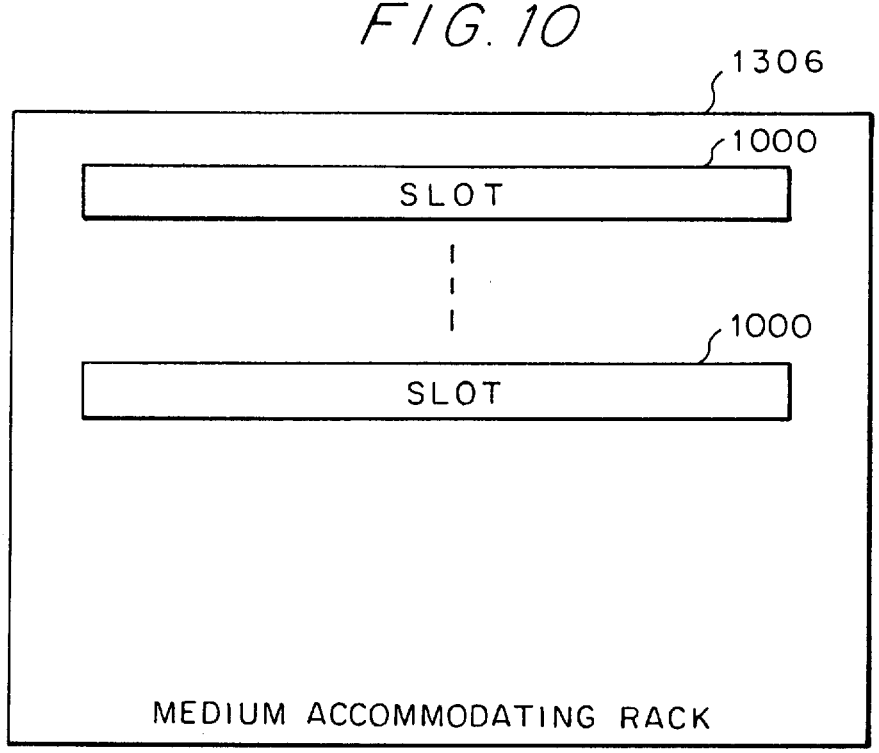
FIG. 10 is a diagram illustrating the configuration of a medium accommodating rack.

FIG. 10 is a diagram illustrating the configuration of the medium accommodating rack 1306. As illustrated in FIG. 10, the medium accommodating rack 1306 is provided with a plurality of slots 1000, namely accommodation units each for accommodating one physical storage medium 1311.

Figure 11A:
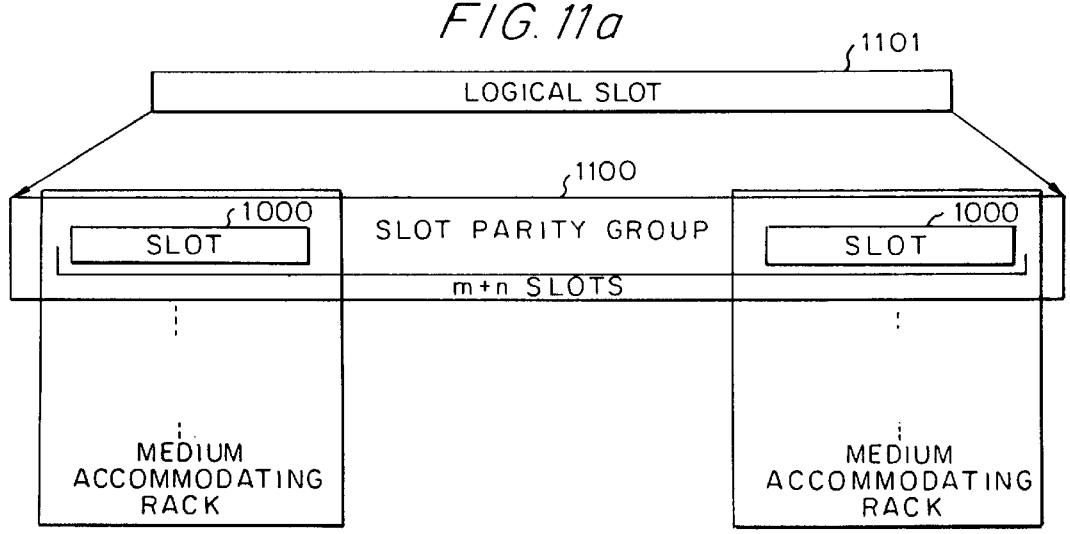
FIGS. 11A–11C are diagrams each illustrating a configuration of a slot parity group and a logical slot.
Figure 11B:
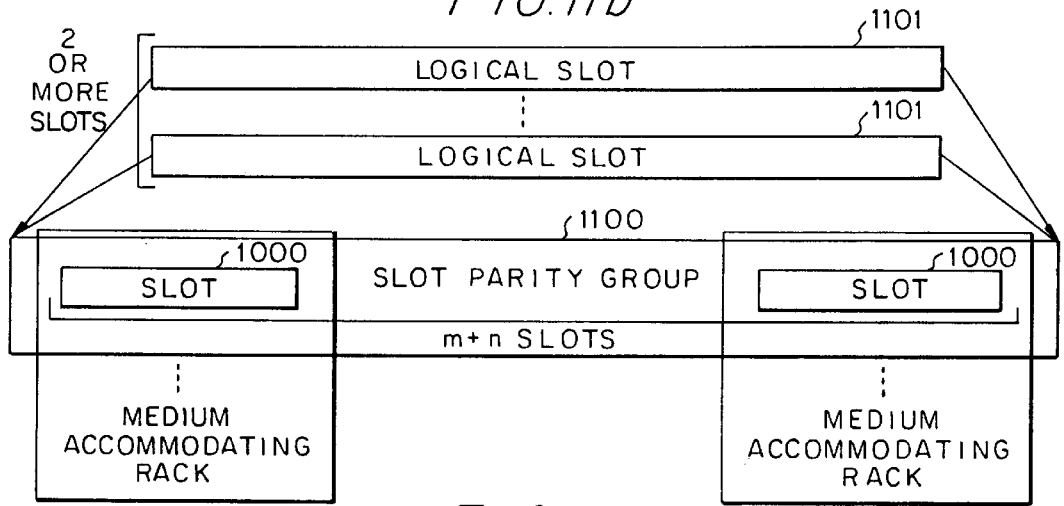
Figure 11C:
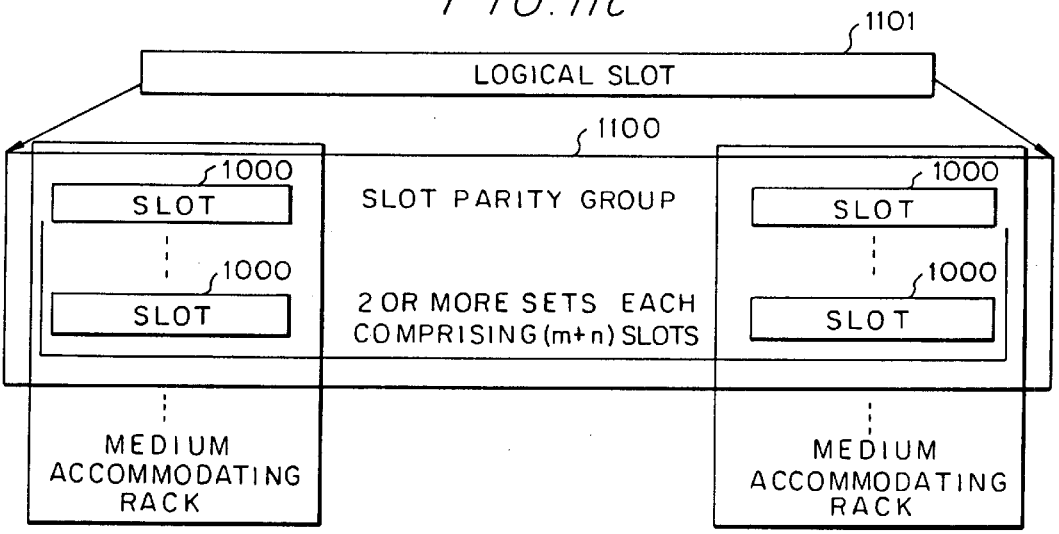

FIGS. 11A–11C are diagrams illustrating slot parity groups 1100 and logical slots 1101. As illustrated in FIGS. 11A–11C, each of the slot parity groups 1100 includes a set of (m+n) slots 1000 for accommodating (m+n) units of physical storage medium 1311 pertaining to one storage medium parity group 1600. In the configuration illustrated in FIGS. 11A–11C, each of slots 1000 pertaining to a slot parity group 1100 are Included in different medium accommodating racks 1306. It should be noted, however, that the present invention is also applicable to a configuration wherein more than one slot in the slot parity group 110 pertains to plural medium accommodating rack 1306 or all slots 1000 included in a slot parity group 1100 pertain to one medium accommodating rack 1306.

The logical slot 1101 appears to the information processing unit 1300 as a logical accommodation unit for accommodating a logical storage medium 400. In the case of a storage medium parity group 1600 corresponding to a logical storage medium 400, a logical slot 1101 is associated with a slot parity group 1100 on a one-to-one basis as illustrated in FIG. 11A. In the case of a storage medium parity group 1600 corresponding to a plurality of logical storage media 400, a slot parity group 1100 is associated with a plurality of logical slots 1101 as illustrated in FIG. 11B. Furthermore, in the case of a plurality of storage medium parity groups 1600 corresponding to a logical storage medium 400, a logical slot 1101 is associated with a plurality of slot parity groups 1100 as illustrated in FIG. 11C.

In each embodiment described below, a storage medium parity group 1600 is associated with a logical storage device 400 on a one-to-one basis. The present invention is also applicable to a configuration wherein a storage medium parity a group 1600 is associated with a plurality of logical storage devices 400 and a configuration wherein one logical storage device 400 is associated with a plurality of storage medium parity groups 1600.

FIGS. 1A and 1B are diagrams illustrating the configuration and the operation of a first embodiment of the present invention implementing a storage apparatus system. As illustrated in FIGS. 1A and 1B, one R/W unit parity group 900 including (m+n) R/W units 1304 is connected to the control unit 1305.

As illustrated in FIG. 1A, a recovery-slot-parity-group identifier 100, a recovery-in-process flag 101, a suspension-request flag 102, a suspension flag 103, a recovery pointer 104 and a R/W-processing-concurrence flag 105 are included in the control unit buffer 1312 which is part of the control unit 1305. The control unit 1305 also includes the directory 1309 and the non-volatile memory control information medium 1401.

In the first embodiment only one storage medium parity group 1600 is undergoing recovery processing. Thus, there is also only one slot parity group 1100 for the storage-medium parity group 1600 undergoing the recovery processing. The recovery-slot-parity-group identifier 100 is the identifier of a slot parity group 1100 for a storage-medium parity group 1600 undergoing recovery processing. The recovery-in-process flag 101 indicates that recovery processing of a storage medium parity group 1600 for a slot parity group 1100 indicated by the recovery-slot-parity-group identifier 100 is under way. The suspension-request flag 102 indicates a request that recovery processing be suspended because a request to mount another slot parity group 1100 has been received. The suspension flag 103 is information indicating that recovery processing of a slot parity group 1100 in a process of recovery has been suspended. The recovery pointer 104 is information indicating how far recovery processing has progressed. After a recovery processing is suspended, recovery processing is resumed from an area indicated by the recovery pointer 104. The recovery pointer 104 may also be stored in each of the physical storage media 1311 pertaining to a storage-medium parity group 1600 undergoing recovery processing. The R/W-processing-concurrence flag 105 indicates that a read/write request issued by the information processing unit 1300 and recovery processing are executed in parallel.

As illustrated in FIGS. 1A and 1B, major functional units of the control unit 1305 include a mount-processing executing unit A 110, a R/W-processing executing unit A 111, a demount-processing executing unit A 112, a recovery-processing mount unit A 113, a recovery-processing R/W unit A 114, and a recovery-processing demount unit A 115.

The mount-processing executing unit A 110 mounts a logical storage medium 400 on a logical R/W unit 901 by using a robot 1307 in accordance with a request made by the information processing unit 1300. In actuality, however, the mount processing executing unit A 110 mounts a storage medium parity group 1600 accommodated in the corresponding slot parity group 1100 on a R/W unit parity group 900.

The R/W-processing executing unit A 111 executes R/W processing on a logical storage medium 400 mounted on a logical R/W unit 901 in accordance with a request made by the information processing unit 1300. The R/W-processing executing unit A 111 executes R/W processing on a storage medium parity group 1600 mounted on a R/W-unit parity group 900. If recovery processing is under way at that time, a processing to suspend the recovery processing is executed.

The demount-processing executing unit A 112 demounts a logical storage medium 400 mounted on a logical R/W unit 901 in accordance with a request made by the information processing unit 1300 by using a robot 1307. The demount-processing executing unit A 112 demounts a storage medium parity group 1600 mounted on the corresponding R/W-unit parity group 900.

The recovery-processing mount unit A 113 mounts a storage medium parity group 1600 accommodated in a slot parity group 1100 associated with it on a R/W-unit parity group 900 by using a robot 1307 in order to recover an out-of-order physical storage medium 1311.

The recovery-processing R/W unit A 114 executes processing to recover a failed physical storage medium 1311. At that time, whether or not a request for suspension of recovery processing has been made is checked. If such a request has been made, a suspension point is stored and a storage medium parity group 1600 undergoing recovery processing is once removed from a R/W-unit parity group 900. The recovery-processing demount unit A 115 demounts a storage-medium parity group 1600 from a R/W-unit parity group 900 by using a robot 1307 upon completion of recovery processing.

The flow of processing of the units described above are explained below in detail by referring to FIGS. 1A and 1B.

First the flow of processing carried out by the mount-processing executing unit A 110 will be explained. As illustrated in FIG. 1A, the flow of processing begins with a step 120 at which the control unit 1305 references the recovery-in-process flag 101. When no recovery processing is being carried out, the flow of processing continues to a step 121 at which the control unit 1305 executes ordinary mount processing. When recovery processing is under way, the flow of processing proceeds to a step 122 at which the control unit 1305 references a recovery-slot-parity-group flag 100 in order to find out whether or not the slot parity group 1100, for which a mount request has been made, is a slot parity group 1100 indicated by the recovery-slot-parity-group identifier 100. When the slot parity group 1100, for which a mount request has been made, is a slot parity group 1100 indicated by the recovery-slot-parity-group identifier 100, the flow of processing continues to a step 123 at which the control unit 1305 turns on the R/W-processing-concurrence flag 105. The flow of processing then continues to a step 124 at which the control unit 1305 notifies the information processing unit 1300 of completion of the requested mount processing. When the slot parity group 1100, for which a mount request has been made, is not a slot parity group 1100 indicated by the recovery-slot-parity-group identifier 100, the flow of processing continues to a step 125 to turn on the recovery-suspension-request flag 102 and to enter a state waiting for the suspension flag 103 to be turned on. The flow of processing then returns to the step 121 at which the control unit 1305 executes ordinary mount processing.

In the first embodiment, when a request to mount is received for a recovery slot parity group, the R/W request is executed at a break in the recovery processing until a request for demount has been received. However, the recovery processing can be temporarily suspended until a request to demount has been received. The second through fourth embodiments, described below, operate similarly.

Next, the flow of processing carried out by the R/W-processing executing unit A 111 will be explained. As illustrated in FIG. 1A, the flow of processing begins with a step 130 at which the control unit 1305 checks whether or not the R/W-processing-concurrence flag 105 is on. If the R/W-processing-concurrence flag 105 is off, the flow of processing continues to a step 131 at which the control unit 1305 executes the requested read/write processing. If the R/W-processing-concurrence flag 105 is on, the flow of processing proceeds to a step 132 at which the control unit 1305 waits for a break in the recovery processing. The flow of processing then returns to the step 131 at which the control unit 1305 executes the requested read/write processing.

Next, the flow of processing carried out by the demount-processing executing unit A 112 will be explained. As illustrated in FIG. 1A, the flow of processing begins with a step 140 at which the control unit 1305 checks whether or not the R/W-processing-concurrence flag 105 is on. When the R/W-processing-concurrence flag 105 is off, the flow of processing proceeds to a step 141 at which the control unit 1305 executes the requested demount processing before proceeding to a step 142. When the R/W-processing-concurrence flag 105 is on, the flow of processing skips the step 141, jumping directly to the step 142 at which the control unit 1305 turns off the R/W-processing-concurrence flag 105 and informs the information processing unit 1300 of completion of the demount processing. The flow of processing then goes on to a step 143 at which the control unit 1305 checks whether or not the suspension flag 103 is on. If the suspension flag 103 is off, the demount processing is ended. If the suspension flag 103 is on, the flow of processing proceeds to a step 144 to make a request for execution of recovery-processing mount processing by the recovery-processing mount unit A 113.

Next, the flow of processing carried out by the recovery-processing mount unit A 113 will be explained. As illustrated in FIG. 1B, the flow of processing begins with a step 150 at which the control unit 1305 mounts a storage medium parity group 1600 to undergo recovery processing on a R/W-unit parity group 900. The flow of processing then proceeds to a step 151 at which the control unit 1305 checks whether or not the suspension flag 103 is on. If the suspension flag 103 is off, the recovery pointer 103 is set at an initial value to indicate that recovery processing has not been carried out at all. The flow of processing then skips a step 152, jumping to a step 153.

When the suspension flag 103 is found turned on at the step 151, the flow of processing proceeds to step 152 at which the control unit 1305 turns off the suspension flag 103. When a value of the recovery pointer 104 has been saved in a physical storage medium 1311, the value is read out to newly set the recovery pointer 104. The flow of processing then continues to a step 153 at which the control unit 1305 sets the identifier of a slot parity group 1100 corresponding to a storage medium parity group 1600 to undergo recovery processing in the recovery-slot-parity-group identifier 100. In addition, the recovery-in-process flag 101 is turned on. The flow of processing then continues to a step 154 at which the control unit 1305 makes a request for execution of recovery processing starting with an area indicated by the recovery pointer 104. Thus, the control unit 1305 makes a request for execution of the recovery-processing R/W unit A 113.

Next, the flow of processing carried out by the recovery-processing R/W unit A 114 is explained. As illustrated in FIG. 1B, the flow of processing begins with a step 160 at which the control unit 1305 executes recovery processing for a partial area. The flow of processing then continues to a step 161 at which the control unit 1305 checks whether or not the recovery processing has been completed for all partial areas. When the recovery processing has been completed for all partial areas, the flow of processing proceeds to a step 162 at which the control unit 1305 makes a request for execution of recovery-processing demount processing. Thus, the control unit 1304 makes a request for execution of the recovery-processing demount unit A 115. When the recovery processing has not been completed for all partial areas, the flow of processing returns to the step 163 at which the control unit 1305 checks whether or not the R/W-processing-concurrence flag 105 is on. If the R/W-processing-concurrence flag 105 is off, the flow of processing returns to step 160 to carry out the recovery processing for a next area. If the R/W-processing-concurrence flag 105 is on, the flow of processing proceeds to a step 164 at which the control unit 1305 waits for completion of a read/write request to be executed. Then, the flow of processing returns to step 160 to carry out the recovery processing for a next area.

Next, the flow of processing carried out by the recovery-processing demount unit A 115 is explained. As illustrated in FIG. 1B, the flow of processing begins with a step 170 at which the control unit 1305 turns off the recovery-in-process flag 101. The flow of processing then goes on to a step 171 at which the control unit 1305 checks whether or not the R/W-processing-concurrence flag 105 is on. When the R/W-processing-concurrence flag 105 is on, the flow of processing proceeds to a step 172 at which the control unit 1305 turns off the R/W-processing-concurrence flag 105, and then ends the processing. When the R/W-processing-concurrence flag 105 is off, the flow of processing proceeds to a step 173 at which the control unit 1305 returns the storage-medium parity group 1600 completing the recovery processing from the R/W-unit parity group 900 to a slot parity group 1100 indicated by the recovery-slot-parity-group identifier 100.

Figures 12A, 12B:
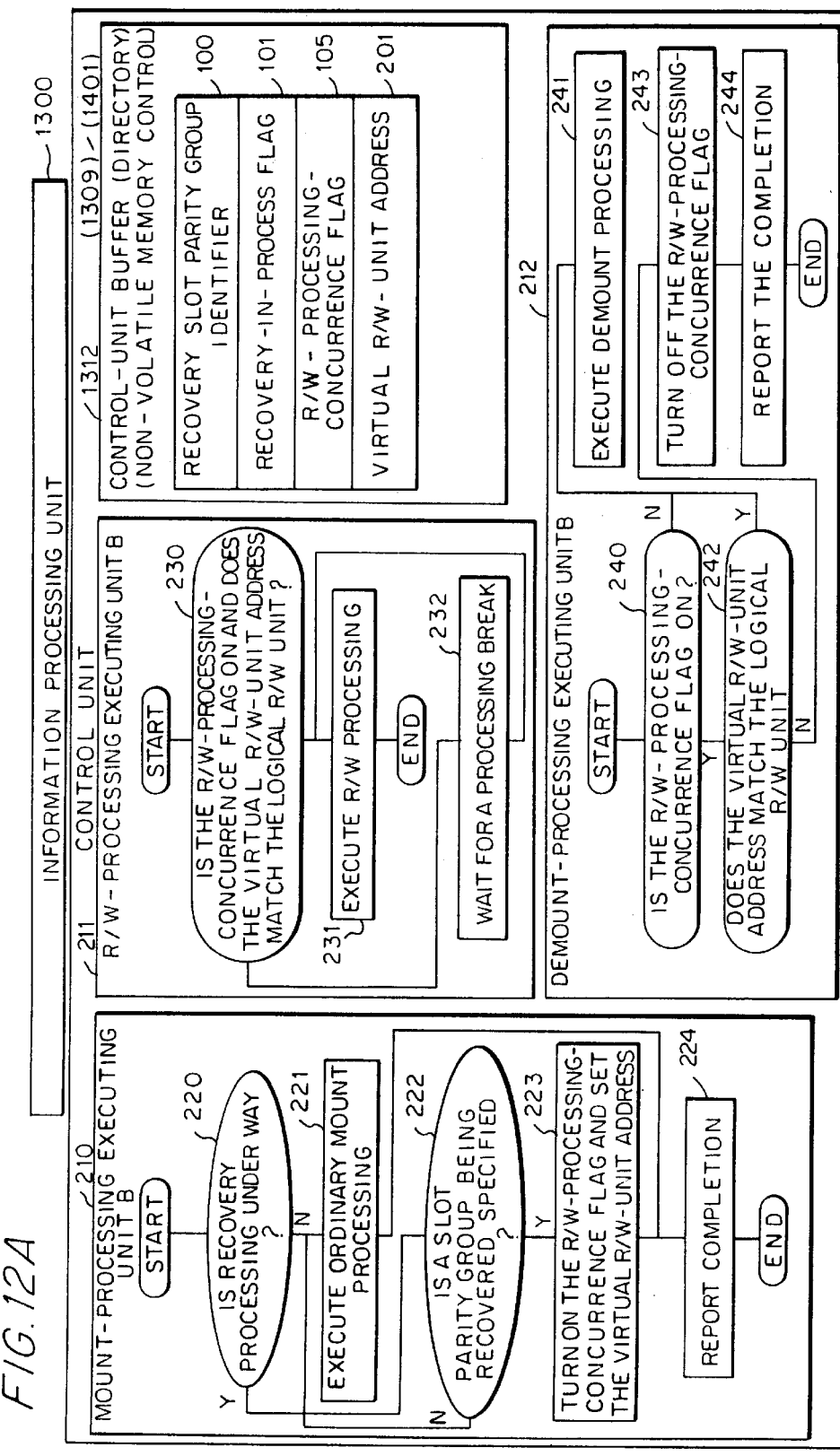
FIGS. 12A–12B are diagrams illustrating the configuration and the operation of a second embodiment implementing a storage apparatus system provided by the present invention.

FIGS. 12A and 12B are diagrams illustrating the configuration and the operation of a second embodiment of the present invention implementing a storage apparatus system. As illustrated in FIGS. 12A and 12B, the second embodiment provided a control unit 1305 having a recovery R/W-unit parity group 200, that is, a R/W-unit parity group 900 dedicated for recovery processing. In the second embodiment only one recovery R/W-unit parity group 200 is provided. It should be noted, however, that the present invention is also applicable to a configuration wherein a plurality of recovery R/W-unit parity groups 200 are provided.

In the second embodiment, recovery processing is carried out by using the recovery R/W-unit parity group 200. As a result, contention for a resource between a read/write request issued by the information processing unit 1300 and recovery processing occurs only when the read/write request from the information processing unit 1300 is made for a storage-medium parity group 1600 currently undergoing recovery processing. In addition, at that time, the control unit 1305 uses the recovery R/W-unit parity group 200 instead of a R/W-unit parity group 900 corresponding to a logical R/W unit 901 requested by the information processing unit 1300.

As illustrated in FIG. 12A, a recovery-slot-parity-group identifier 100, a recovery-in-process flag 101 and a R/W-processing-concurrence flag 105 are included in the control buffer 1312 of the control unit 1305, also provided are a directory 1309 and a non-volatile memory control information medium 1401. These pieces of information are also included in the first embodiment and have the same meanings as those of the first embodiment. In addition, in the second embodiment, a virtual R/W-unit addresses 201 is used. As described above, when the read/write request from the information processing unit 1300 is made for a storage-medium parity group 1600 currently undergoing recovery processing, the control unit 1305 uses the recovery R/W-unit parity group 200 instead of a R/W-unit parity group 900 corresponding to a logical R/W unit 901 requested by the information processing unit 1300. At that time, the recovery R/W-unit parity group 200 appears to the information processing unit 1300 as the logical R/W unit 901 requested by the information processing unit 1300. The virtual R/W-unit address 201 is set at a value of an address corresponding to the logical R/W unit 901.

As illustrated in FIGS. 12A and 12B, major functional units of the control unit 1305 include a mount-processing executing unit B 210, a R/W-processing executing unit B 211, a demount-processing executing unit B 212, a recovery-processing mount unit B 213, a recovery-processing R/W unit B 214 and a recovery-processing demount unit B 215. The mount-processing executing unit B 210, the R/W-processing executing unit B 211, the demount-processing executing unit B 212, the recovery-processing mount unit B 213, the recovery-processing R/W unit B 214 and the recovery-processing demount unit B 215 correspond to the mount-processing executing unit A 110, R/W-processing executing unit A 111, demount-processing executing unit A 112, recovery-processing mount unit A 113, recovery-processing R/W unit A 114 and recovery-processing demount unit A 115 employed in the first embodiment respectively. The flow of processing carried out by the major units described above are explained by referring to FIGS. 12A and 12B as follows.

The flow of processing carried out by the mount-processing executing unit B 210 will be is explained. As illustrated in FIG. 12A, the flow of processing begins with a step 220 at which the control unit 1305 references the recovery-in-process flag 101. When no recovery processing is carried out, the flow of processing proceeds to a step 221 at which the control unit 1305 executes ordinary mount processing. If recovery processing is under way, the flow of processing proceeds to a step 222 at which the control unit 1305 references a recovery-slot-parity-group flag 100 in order to find out whether or not the slot parity group 1100, for which a mount request has been made, is a slot parity group 1100 indicated by the recovery-slot-parity-group identifier 100. If the slot parity group 1100, for which a mount request has been made, is a slot parity group 1100 indicated by the recovery-slot-parity-group identifier 100, the flow of processing continues to a step 223 at which the control unit 1305 turns on the R/W-processing concurrence flag 105 and further sets the logical R/W unit 901 specified by the information processing unit 1300 at the virtual R/W-unit address 201. The flow of processing then goes on to a step 224 at which the control unit 1305 notifies the information processing unit 1300 of completion of the requested mount processing.

Next, the flow of processing carried out by the R/W-processing executing unit B 211 will be explained. As illustrated in FIG. 12A, the flow of processing begins with a step 230 at which the control unit 1305 checks whether or not the R/W-processing-concurrence flag 105 is on. If the R/W-processing-concurrence flag 105 is on, the control unit 1305 further checks the logical R/W unit 901 specified by the information processing unit 1300 to determine whether or not the logical R/W unit 901 specified by the information processing unit 1300 matches the virtual R/W-unit address 201. If at least either the R/W-processing-concurrence flag 105 is off or the logical R/W unit 901 specified by the information processing unit 1300 does not match the virtual R/W-unit address 201, the flow of processing proceeds to a step 231 at which the control unit 1305 executes the requested read/write processing by using the recovery R/W-unit parity group 900 corresponding to the specified logical R/W unit 901. If the R/W-processing-concurrence flag 105 is on and the logical R/W unit 901 specified by the information processing unit 1300 matches the virtual R/W-unit address 201, the flow of processing proceeds to a step 232 at which the control unit 1305 waits for a break in the recovery processing. The flow of processing then returns to step 231 at which the control unit 1305 executes the requested read/write processing by using the recovery R/W-unit parity group 200.

Next, the flow of processing carried out by the demount-processing executing unit B 212 will be explained. As illustrated in FIG. 12A, the flow of processing begins with a step 240 at which the control unit 1305 checks whether or not the R/W-processing-concurrence flag 105 is on. When the R/W-processing-concurrence flag 105 is off, the flow of processing continues to a step 241 at which the control unit 1305 executes ordinary demount processing. If the R/W-processing-concurrence flag 105 is turned on at the step 240, the flow of processing proceeds to a step 242 at which the control unit 1305 further checks the logical R/W unit 901 specified by the information processing unit 1300 to determine whether or not the logical R/W unit 901 specified by the information processing unit 1300 matches the virtual R/W-unit address 201. If the logical R/W unit 901 specified by the information processing unit 1300 does not match the virtual R/W-unit address 201, the flow of processing continues to a step 241 at which the control unit 1305 executes ordinary demount processing before jumping to step 244. If the logical R/W unit 901 specified by the information processing unit 1300 matches the virtual R/W-unit address 201, the flow of processing goes on to a step 243 at which the control unit 1305 turns off the R/W-processing-concurrence flag 105. The flow of processing then proceeds to step 244 at which the information processing unit 1300 is notified of completion of the demount processing.

Next, the flow of processing carried out by the recovery-processing mount unit B 213 will be explained. As illustrated in FIG. 12B, the flow of processing begins with a step 250 at which the control unit 1305 mounts a storage medium parity group 1600 to undergo recovery processing on a R/W-unit parity group 900. The flow of processing then proceeds to a step 251 at which the control unit 1305 sets the identifier of a slot parity group 1100 corresponding to a storage-medium parity group 1600 to undergo recovery processing in the recovery-slot-parity-group identifier 100. In addition, the recovery-in-process flag 101 is turned on. The flow of processing then continues to step 252 at which the control unit 1305 makes a request for execution of recovery processing starting with an area indicated by the recovery pointer 104. Thus, the control unit 1305 makes a request for execution of the recovery-processing R/W unit B 214.

As the processing of the recovery processing R/W unit B 214 is the same as the processing of the recovery-processing R/W unit A 114, the explanation of the flow of processing carried out by the recovery-processing R/W unit B 214 is omitted. Further, as the processing of the recovery-processing demount unit B 215 is the same as the processing of the recovery-processing demount unit A 115, the explanation of the flow of processing carried out the recovery-processing demount unit B 215 is omitted.

Figure 13:
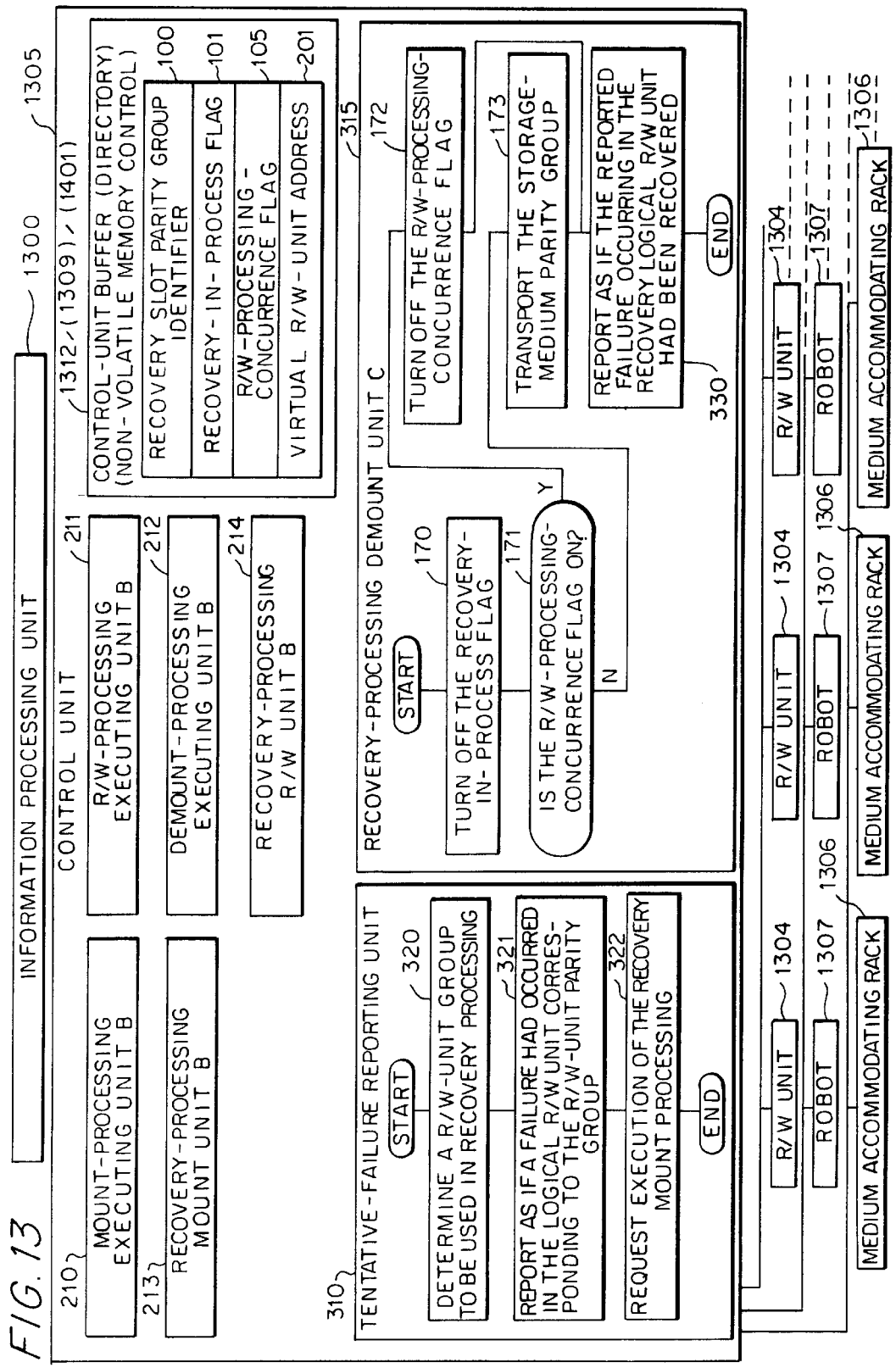
FIG. 13 is a diagram illustrating the configuration and the operation of a third embodiment implementing a storage apparatus system provided by the present invention.

FIG. 13 is a diagram illustrating the configuration and the operation of a third embodiment of the present invention implementing a storage apparatus system. As illustrated in FIG. 13, the control unit 1305 allocates a R/W-unit parity group 900 to recovery processing when recovery processing needs to be carried out. When nothing is done in particular, the information processing unit 1300 makes a request to mount a storage medium parity group 1600 on the R/W-unit parity group 900 allocated to the recovery processing. In the case of the third embodiment, the logical R/W unit 901 corresponding to the R/W-unit parity group 900 allocated to the recovery processing is set to appear to the information processing unit 1300 as if the logical R/W unit 901 were out of order. By doing so, the information processing unit 1300 can be prevented from making a request to mount a storage-medium parity group 1600 on a R/W-unit parity group 900 allocated to the recovery processing.

As illustrated in FIG. 13, a recovery-slot-parity-group identifier 100, a recovery-in-process flag 101, a R/W-processing-concurrence flag 105 and a virtual R/W unit address 201 in the control buffer 1312 components of the control unit 1305. Also provided are the directory 1309 and the non-volatile memory control information medium 1401. These pieces of information are also included in the second embodiment and have the same meanings as those of the second embodiment.

As illustrated in FIG. 13, major functional units of the control unit 1305 include a mount-processing executing unit B 210, a R/W-processing executing unit B 211, a demount-processing executing unit B 212, a recovery-processing mount unit B 213, a recovery-processing R/W unit B 214 and a recovery-processing demount unit C 315. Except the recovery-processing demount unit C 315, all the major functional units are the same as those of the second embodiment, making it unnecessary to repeat their explanation. The third embodiment further includes a tentative-failure reporting unit 310. Differences in function between the third and second embodiments are explained as follows.

First a flow of processing carried out by the tentative-failure reporting unit 310 will be explained by referring to FIG. 13. As illustrated in FIG. 13, the flow of processing begins with a step 320 at which the control unit 1305 determines a R/W-unit parity group 900 to be allocated to the recovery processing. The flow of processing then proceeds to a step 321 at which the control unit 1305 notifies the information processing unit 1300 as if a failure had occurred in the logical R/W unit 901 corresponding to the R/W-unit parity group 900 to be allocated to the recovery processing. The flow of processing finally proceeds to a step 322 at which the recovery-processing mount unit B 210 is activated.

In the recovery-processing demount unit C 315, the control unit 1305 at a last step 330 notifies the information processing unit 1300 as if the failure reported at the step 321 to the information processing unit 1300 occurring in the logical R/W unit 901 corresponding to the R/W-unit parity group 900 allocated to the recovery processing had been recovered.

FIGS. 14A and 14B are diagrams illustrating the configuration and the operation of a fourth embodiment of the present invention implementing a storage apparatus system. As illustrated in FIGS. 14A and 14B, the control unit 1305 allocates a R/W-unit parity group 900 to recovery processing when recovery processing needs to be carried out as in the third embodiment. Also much like the third embodiment, when nothing is done in particular, the information processing unit 1300 makes a request to mount a storage-medium parity group 1600 on the R/W-unit parity group 900 allocated to the recovery processing. In the fourth embodiment, the control unit 1305 dynamically changes the relation between the logical R/W unit 901 and the R/W-unit parity group 900. That is, the relation is changed so that the R/W-unit parity group 900 allocated to the recovery processing is not assigned to the logical R/W unit 901 by the information processing unit 1300. If the number of R/W-unit parity groups 900 used for carrying out read/write processing requested by the information processing unit 1300 is smaller than the number of logical R/W units 901 seen by the information processing unit 1300, a mount request to a logical R/W unit 901 which can not be allocated to a R/W-unit parity group 900 is put in a suspended state until a R/W-unit parity group 900 moves into a allocatable state.

As illustrated in FIG. 14A, a recovery-slot-parity-group identifier 100, a recovery-in-process flag 101, a R/W-processing-concurrence flag 105 and a virtual R/W unit address 201 are included in the control unit buffer 1312 of the control unit 1305. Also provided are the directory 1309 and the non-volatile memory control information medium 1401. These pieces of information are also included in the second embodiment and have the same meanings as those of the second embodiment. In the case of the fourth embodiment, however, allocated-R/W-unit-parity-group information 350, R/W-unit-parity-group information 351 and recovery-R/W-unit-parity-group information 352 are further included.

The allocated-R/W-unit-parity-group information 350 is information corresponding to each logical R/W unit 901. The allocated-R/W-unit-parity-group information 350 is information that indicates which R/W-unit parity group 900 a logical R/W unit 901 corresponds to. The R/W-unit-parity-group information 351 is information corresponding to each R/W-unit parity group 901. The R/W-unit-parity-group information 351 is information that indicates whether a R/W-unit parity group 900 is allocatable or not. The recovery-R/W-unit-parity-group information 352 is the identifier of a R/W-unit parity group 900 allocated to the recovery processing. In the third embodiment to be described below, there is only one piece of recovery-R/W-unit-parity-group information 352, and only one R/W-unit parity group 900 allocated to the recovery processing. The present invention is also applicable to a case in which there are a plurality of R/W-unit parity groups 900 allocated to the recovery processing.

As illustrated in FIGS. 14A and 14B, major functional units of the control unit 1305 include a mount-processing executing unit C 360, a R/W-processing executing unit C 361, a demount-processing executing unit C 362, a recovery-processing mount unit C 363, a recovery-processing R/W unit C 364 and a recovery-processing demount unit D 365. The flow of processings carried by the major units described above are explained by referring to FIGS. 14A and 14b as follows.

First the flow of processing carried out by the mount-processing executing unit C 360 will be explained. As illustrated in FIG. 14A, the processing flow begins with a step 370 at which the control unit 1305 references the R/W-unit-parity-group information 351 in order to find out whether there is a R/W-unit parity group 900 that is allocatable. If no R/W-unit parity group 900 is allocatable, the flow of processing goes on to a step 371 at which the control unit 1305 puts the mount request in question in a pending state and temporarily halts the processing. At that time, a wait state is set in the allocated-R/W-unit-parity-group information 350 provided for the logical R/W unit 901 specified in the mount request by the information processing unit 1300. If an allocatable R/W-unit parity group 900 is found, the flow of processing proceeds to a step 372 at which the control unit 1305 sets the identifier of the allocatable R/W-unit parity group 900 in the allocated-R/W-unit-parity-group information 350 provided for the logical R/W unit 901 specified in the mount request by the information processing unit 1300. When the control unit 1305 makes the state of the corresponding R/W-parity-group information unallocatable, the flow of processing then continues to a step 373 at which the control unit 1305 checks whether or not the received mount request has been made for a storage-medium parity group 1600 which is currently undergoing recovery processing. If the received mount request has been made for a storage-medium parity group 1600 which is currently undergoing recovery processing, the flow of processing goes on to a step 374 at which the control unit sets again the identifier of the R/W-unit parity group 900 allocated for the recovery processing in the allocated-R/W-unit-parity-group information 350 provided for the logical R/W unit 901 specified in the mount request by the information processing unit 1300. Processing carried out thereafter is the same as that of the mount-processing executing unit B 210.

Next, the flow of processing carried out by the R/W-processing executing unit C 361 will be explained. As illustrated in FIG. 14A, the flow of processing begins with a step 380 at which the control unit 1305 references the allocated-R/W-unit-parity-group information 350 provided for the logical R/W unit 901 specified in a request from the information processing unit 1300 in order to identify which R/W-unit parity group 900 the request has been issued to. The processing carried out thereafter is the same as that of the R/W-processing executing unit B 211.

Next, the flow of processing carried out by the demount-processing executing unit C 362 will be explained. As illustrated in FIG. 14A, the flow of processing begins with a step 390 at which the control unit 1305 references the allocated-R/W-unit-parity-group information 350 provided for the logical R/W unit 901 specified in a request from the information processing unit 1300 in order to identify which R/W-unit parity group 900 the request has been issued to. The flow of processing then proceeds to a step 391 at which the control unit 1305 references the R/W-processing-concurrence flag 105 in order to determine whether the R/W-processing-concurrence flag 105 is on or off. If the R/W-processing-concurrence flag 105 is off, the flow of processing proceeds to a step 392 at which the relevant R/W-unit-parity-group information 351 is set to indicate an allocatable state. With the R/W-processing-concurrence flag 105 turned off, the control unit 1305 further references the allocated-R/W-unit-parity-group information 350 in order to check whether or not there is a pending mount request and store the pending mount request, if any. Then, the processing of the demount-processing executing unit B 212 is carried out. Finally, the flow of processing continues to a step 393 at which the control unit 1305 activates the mount-processing executing unit C 360 in order to execute mount processing of a stored pending mount request, if any.

Next, the flow of processing carried out by the recovery-processing mount unit C 363 will be explained. As illustrated in FIG. 14B, the processing flow begins with a step 410 at which the control unit 1305 references the R/W-unit-parity-group information 351 in order to determine whether there is a R/W-unit parity group 900 that is allocatable. If no R/W-unit parity group 900 is available, the control unit 1305 temporarily halts the processing. If an available R/W-unit parity group 900 is found, the flow of processing proceeds to a step 411 at which the control unit 1305 sets the identifier of the available R/W-unit parity group 900 in the recovery-R/W-unit-parity-group information 352. Then the control unit 1305 makes the state of the corresponding R/W-parity-group information 351 unallocatable. Processing carried out thereafter is the same as that of the recovery-processing mount unit B 213.

Since the processing of the recover-processing R/W unit C is the same as the recovery-processing R/W unit B 214 an explanation of the flow of processing carried out the recovery-processing R/W unit C 364 is omitted.

Next, the flow of processing carried out by the recovery-processing demount unit D 365 will be explained. As illustrated in FIG. 14B, the flow of processing begins with a step 420 at which the control unit 1305 references the R/W-processing-concurrence flag 105 in order to find out whether the flag 105 is on or off. If the R/w-processing-concurrence flag 105 is off, the flow of processing proceeds to a step 421 at which the R/W-unit-parity-group information 351 corresponding to the recovery-R/W-unit-parity-group information 352 is set to indicate an allocatable state and then proceeds to step 422. If the R/W-processing-concurrence flag 105 is on, the flow of processing continues to step 422. At step 422 the control unit 1305 further references the allocated-R/W-unit-parity-group information 350 in order to check whether or not there is a pending mount request and store the pending mount request, if any. Then, the same processing as that of the recovery-processing demount unit B 215 is carried out.

The flow of processing then proceeds to step 423 at which the control unit 1305 clears the recovery-R/W-unit-parity-group information 352. Then, the flow of processing proceeds to a step 424 at which the control unit 1305 makes a request for execution of processing of a stored pending mount request, if any. Thus, the control unit 1305 makes a request for execution of the mount-processing executing unit C 360.

By virtue of the present invention, in the event of a failure occurring in a portable storage medium with redundancy employed in a storage apparatus system based on such portable media, it is possible to execute processing to recover data stored in the storage medium incurring the failure while accepting a read/write request issued by an information processing unit. In order to implement this capability, the storage apparatus system is provided with a function to allocate a R/W unit to recovery processing independently of a request issued by the information processing unit.

While the present invention has been described in detail and pictorially in the accompanying drawings it is not limited to such details since many changes and modifications recognizable to those of ordinary skill in the art may be made to the invention without departing from the spirit and the scope thereof.

I claim:
1. A storage apparatus system comprising:
at least two storage medium groups each comprising (m+n) pieces of storage medium, where m and n are integers and where m≧1 and n≧1, each of said (m+n) pieces of storage medium being used for storing at least one record group including m data records and n redundant records, wherein each of said data records contains data accessed by an information processing unit and each of said redundant records contains redundant data for recovering data contained in said data records;
at least one medium accommodating rack comprising a plurality of accommodation units each for accommodating one of said (m+n) pieces of storage medium;
at least two read/write-unit groups each comprising (m+n) read/write units for mounting said (m+n) pieces of storage medium and carrying out read/write operations on said (m+n) pieces of storage medium;
at least one robot for transporting said (m+n) pieces of storage medium between said medium accommodating racks and said read/write units;
a control unit for controlling said medium accommodating rack, said read/write units and said robot in accordance with a request made by said information processing unit; and
means for allocating in advance one of said read/write-unit groups as a read/write-unit group dedicated for execution of processing to recover data stored in any of said (m+n) pieces of storage medium incurring a failure.

2. A storage apparatus system according to claim 1 further comprising:
means for executing a request for access, from said information processing unit, to a storage medium other than said storage medium currently undergoing recovery processing by using said read/write-unit group allocated to said recovery processing when said request is received during said recovery processing.

3. A storage apparatus system comprising:
at least two storage-medium groups each comprising (m+n) pieces of storage medium, where m and n are integers and where m≧1 and n≧1, each of said (m+n) pieces of storage medium being used for storing at least one record group each including m data records and n redundant records, wherein each of said data records contains data accessed by an information processing unit and each of said redundant records contains redundant data for recovering data contained in said data records;
at least one medium accommodating rack comprising a plurality of accommodation units each for accommodating one of said (m+n) pieces of storage medium;
at least two read/write-unit groups each comprising (m+n) read/write units for mounting said (m+n) pieces of storage medium and carrying out read/write operations on said (m+n) pieces of storage medium;
at least one robot for transporting said (m+n) pieces of storage medium between said medium accommodating rack and said read/write units;
a control unit for controlling said medium accommodating rack, said read/write units and said robot in accordance with a request made by said information processing unit; and means for allocating one of said read/write-unit groups as one required for execution of processing to recover data stored in a storage medium incurring a failure and sending said information processing unit an indication that a failure has occurred in said allocated read/write-unit group, thereby temporarily preventing use of said allocated read/write-unit group.

4. A storage apparatus system according to claim 3 further comprising:

means for executing a request for access, from said information processing unit, to a storage medium other than said storage medium currently undergoing recovery processing by using said read/write-unit group allocated to said recovery processing when said request is received during said recovery processing.

5. A storage apparatus system according to claim 3 further comprising:

means for sending said information processing unit an indication that said failure in said allocated read/write-unit group has been recovered when said recovery processing of said storage medium incurring a failure has been completed.

6. A controller for controlling a storage apparatus system which includes at least one storage-medium group comprising a plurality of storage media for storing data records and redundant records, wherein each data records contains data accessed by an information processing unit and each redundant record contains redundant data for recovering data contained in said data records, at least one medium accommodating rack comprising a plurality of accommodation units each for accommodating one of said storage media, at least two read/write unit groups each comprising a plurality of read/write units for mounting said storage media and carrying out read/write operations on said storage media, and at least one robot for transporting said storage media between said medium accommodating rack and said read/write units, said controller comprising:

a control unit for controlling said medium accommodating rack, said read/write units and said robot in accordance with a request made by said information processing unit; and means for allocating in advance one of said read/write-unit groups as a read/write-unit group dedicated for execution of processing to recover data stored in any of said storage media incurring a failure.

7. A controller according to claim 6 further comprising:

means for executing a request for access, from said information processing unit, to a storage media other than said storage media currently undergoing recovery processing by using said read/write-unit group allocated to said recovery processing when said request is received during said recovery processing.

8. A controller for controlling a storage apparatus system which includes at least two storage-medium groups each comprising a plurality of storage media for storing data records and redundant records, wherein each data records contains data accessed by an information processing unit and each redundant record contains redundant data for recovering data contained in said data records, at least one medium accommodating rack comprising a plurality of accommodation units each for accommodating one of said storage media, at least one read/write unit group comprising a plurality of read/write units for mounting said storage media and carrying out read/write operations on said storage media, and at least one robot for transporting said storage media between said medium accommodating rack and said read/write units, said controller comprising:

a control unit for controlling said medium accommodating rack, said read/write units and said robot in accordance with a request made by said information processing unit;

means for allocating one of said read/write-unit groups as one required for execution of processing to recover data stored in a storage media incurring a failure and sending said information processing unit an indication that a failure has occurred in said allocated read/write-unit group, thereby temporarily preventing use of said allocated read/write-unit group; and means for executing a request for access, from said information processing unit, to a storage media other than said storage media currently undergoing recovery processing by using said read/write-unit group allocated to said recovery processing when said request is received during said recovery processing.

9. A method of controlling a storage apparatus system which includes at least two storage-medium groups each comprising a plurality of storage media for storing data records redundant records, wherein each data records contains data accessed by an information processing unit and each redundant record contains redundant data for recovering data contained in said data records, at least one medium accommodating rack comprising a plurality of accommodation units each for accommodating one of said storage media, at least two read/write unit groups each comprising a plurality of read/write units for mounting said storage media and carrying out read/write operations on said storage media, and at least one robot for transporting said storage media between said medium accommodating rack and said read/write units, said method comprising the steps of:

controlling said medium accommodating rack, said read/write units and said robot in accordance with a request made by said information processing unit; and allocating in advance one of said read/write-unit groups as a read/write-unit group dedicated for execution of processing to recover data stored in any of said storage media incurring a failure.

10. A method according to claim 9 further comprising the step of:

executing a request for access, from said information processing unit, to a storage media other than said storage media currently undergoing recovery processing by using said read/write-unit group allocated to said recovery processing when said request is received during said recovery processing.

11. A method of controlling a storage apparatus system which includes at least two storage-medium groups each comprising a plurality of storage media for storing data records and redundant records, wherein each data records contains data accessed by an information processing unit and each redundant record contains redundant data for recovering data contained in said data records, at least one medium accommodating rack comprising a plurality of accommodation units each for accommodating one of said storage media, at least one read/write unit group comprising a plurality of read/write units for mounting said storage media and carrying out read/write operations on said storage media, and at least one robot for transporting said storage media between said medium accommodating rack and said read/write units, said method comprising the steps of:

controlling said medium accommodating rack, said read/write units and said robot in accordance with a request made by said information processing unit;

allocating one of said read/write-unit groups as one required for execution of processing to recover data stored in a storage media incurring a failure;

sending said information processing unit an indication that a failure has occurred in said allocated read/write-unit group, thereby temporarily preventing use of said allocated read/write-unit group; and executing a request for access, from said information processing unit, to a storage media other than said storage media currently undergoing recovery processing by using said read/write-unit group allocated to said recovery processing when said request is received during said recovery processing.

* * * * *